(12) United States Patent
Gulick, Jr. et al.

(10) Patent No.: US 11,910,937 B2
(45) Date of Patent: *Feb. 27, 2024

(54) SECURE PRODUCT DISPENSER

(71) Applicant: Scorpion Security Products, Inc., Vestal, NY (US)

(72) Inventors: Franklyn W. Gulick, Jr., Binghamton, NY (US); John Farinola, Monroe Township, NJ (US); Eric Henry, Bound Brook, NJ (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/584,902

(22) Filed: Jan. 26, 2022

(65) Prior Publication Data

US 2022/0142378 A1 May 12, 2022

Related U.S. Application Data

(63) Continuation-in-part of application No. 16/840,028, filed on Apr. 3, 2020, now Pat. No. 11,363,884.

(60) Provisional application No. 63/141,565, filed on Jan. 26, 2021, provisional application No. 62/990,090, filed on Mar. 16, 2020, provisional application No. 62/828,815, filed on Apr. 3, 2019.

(51) Int. Cl.
*A47F 1/12* (2006.01)
*B65G 1/08* (2006.01)

(52) U.S. Cl.
CPC .............. *A47F 1/126* (2013.01); *B65G 1/08* (2013.01)

(58) Field of Classification Search
CPC ... B65G 1/08; A47F 1/126; A47F 1/00; A47F 1/03; A47F 1/12; A47F 5/005; A47B 73/00; A47B 73/004; A47B 73/006; A47B 45/00
See application file for complete search history.

(56) References Cited

U.S. PATENT DOCUMENTS

| | | | | |
|---|---|---|---|---|
| 5,462,198 A | * | 10/1995 | Schwimmer | A47F 1/087 221/281 |
| 5,865,324 A | * | 2/1999 | Jay | A47F 1/12 211/74 |
| D519,038 S | * | 4/2006 | Stoddard | A47F 1/12 D9/733 |
| 7,631,771 B2 | * | 12/2009 | Nagel | A47F 3/0486 211/59.3 |
| D646,162 S | * | 10/2011 | Taylor | D9/434 |

(Continued)

*Primary Examiner* — Devin K Barnett
(74) *Attorney, Agent, or Firm* — Barclay Damon LLP

(57) ABSTRACT

A secure product dispenser assembly comprises a base portion having a first end and a second end, and being configured to hold a plurality of units of product. The base portion comprises a bottom, a first divider coupled to the bottom, and a second divider positioned opposite the first divider and coupled the bottom. A top portion is configured to adjustably couple to the base portion and a dispenser portion is coupled to the top portion and positioned at the first end of the base portion. The dispenser portion is configured to rotate between an open position to enable removal of one unit of product from the first end of the base, and a closed position inhibiting removal of the one unit of product from the first end of the base.

19 Claims, 27 Drawing Sheets

(56) References Cited

U.S. PATENT DOCUMENTS

| | | | | |
|---|---|---|---|---|
| 8,925,744 B1* | 1/2015 | Jang | | A47F 1/12 |
| | | | | 211/126.12 |
| 9,445,675 B1* | 9/2016 | DeSena | | A47F 1/126 |
| 9,700,156 B1* | 7/2017 | Hance | | A47B 57/583 |
| 9,901,191 B1* | 2/2018 | Schmidt | | A47F 5/005 |
| 10,555,623 B2* | 2/2020 | Kologe | | A47B 57/58 |
| 10,561,238 B1* | 2/2020 | Gutierrez | | A47F 7/283 |
| D904,008 S* | 12/2020 | Al-Bayati | | D3/203.2 |
| 10,869,562 B1* | 12/2020 | Bryan | | A47B 57/583 |
| 2005/0127014 A1* | 6/2005 | Richter | | A47F 1/126 |
| | | | | 211/184 |
| 2005/0189310 A1* | 9/2005 | Richter | | A47F 1/126 |
| | | | | 211/59.3 |
| 2008/0156751 A1* | 7/2008 | Richter | | A47F 1/126 |
| | | | | 211/59.2 |
| 2009/0277924 A1* | 11/2009 | Kottke | | A47F 5/005 |
| | | | | 16/221 |
| 2012/0103922 A1* | 5/2012 | Bird | | A47F 1/126 |
| | | | | 211/59.3 |
| 2014/0034590 A1* | 2/2014 | Szpak | | A47F 1/12 |
| | | | | 211/59.2 |
| 2014/0034591 A1* | 2/2014 | Szpak | | A47F 5/005 |
| | | | | 211/49.1 |
| 2014/0263112 A1* | 9/2014 | Bird | | A47F 7/285 |
| | | | | 49/386 |
| 2014/0299559 A1* | 10/2014 | Bird | | A47F 5/005 |
| | | | | 211/59.2 |
| 2014/0332480 A1* | 11/2014 | Hardy | | A47B 87/0223 |
| | | | | 211/59.3 |
| 2015/0076089 A1* | 3/2015 | Howard | | A47F 1/12 |
| | | | | 211/49.1 |
| 2015/0359358 A1* | 12/2015 | Miller, Jr. | | G09F 3/204 |
| | | | | 211/59.2 |
| 2015/0374120 A1* | 12/2015 | Hardy | | A47F 7/0007 |
| | | | | 211/59.4 |
| 2016/0058204 A1* | 3/2016 | Bernard | | A47F 1/087 |
| | | | | 211/59.2 |
| 2016/0262554 A1* | 9/2016 | Vitollo | | A47F 7/28 |
| 2017/0202368 A1* | 7/2017 | Bird | | A47F 1/04 |
| 2018/0042401 A1* | 2/2018 | Sun | | A47F 5/005 |
| 2018/0103779 A1* | 4/2018 | Schmidt | | A47F 1/123 |
| 2019/0098995 A1* | 4/2019 | Brown | | A47B 57/545 |
| 2019/0274449 A1* | 9/2019 | Johnson | | A47F 7/0007 |

* cited by examiner

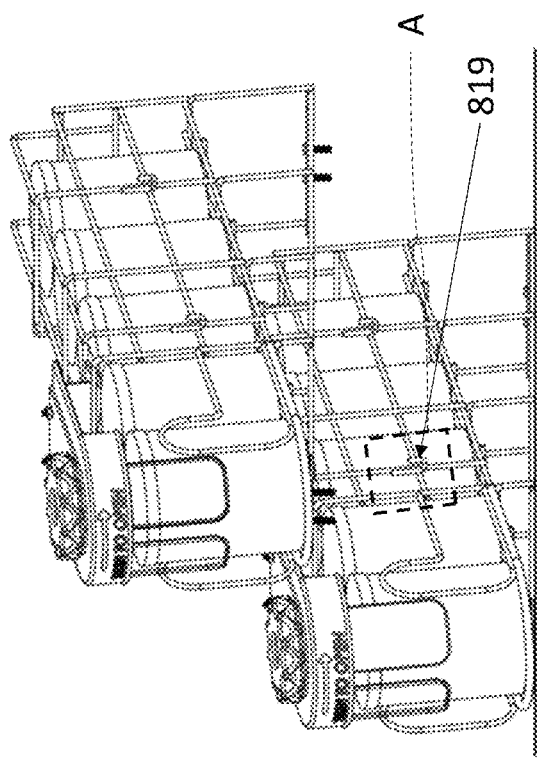
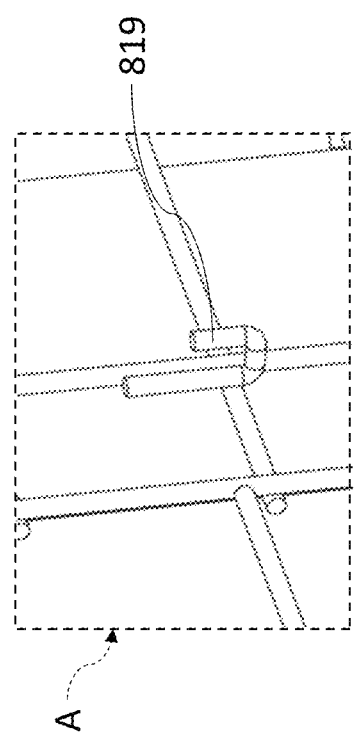
FIG. 29B
FIG. 29A

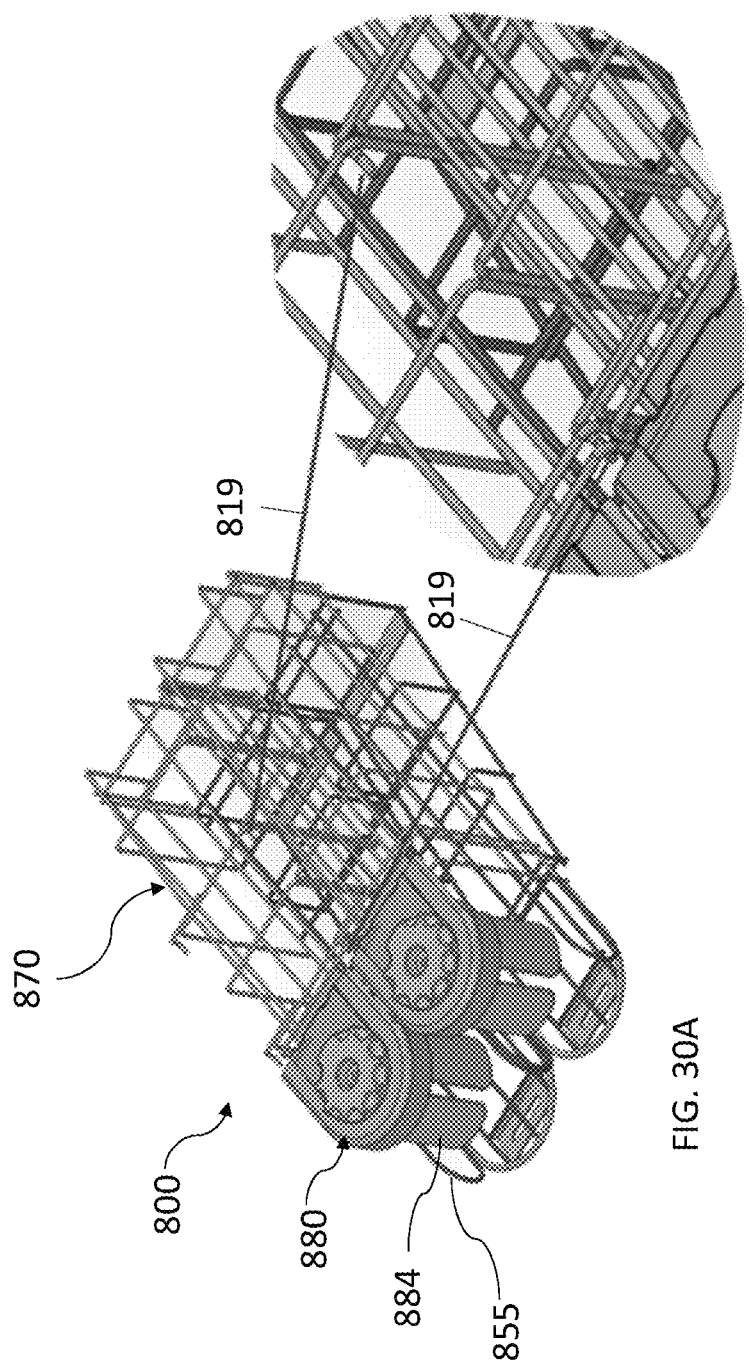

SECURE PRODUCT DISPENSER

CROSS REFERENCE TO RELATED APPLICATIONS

This patent application claims the priority and benefit of U.S. Provisional Patent Application 63/141,565, filed on Jan. 26, 2021, and is a continuation-in-part of, and claims the priority and benefit of, U.S. patent application Ser. No. 16/840,028, filed on Apr. 3, 2020, which claims the priority and the benefit of U.S. Provisional Patent Application No. 62/828,815, filed on Apr. 3, 2019, and U.S. Provisional Patent Application No. 62/990,090, filed on Mar. 16, 2020. The entire contents of such applications are hereby incorporated by reference.

FIELD OF TECHNOLOGY

The subject matter disclosed herein relates to secure product dispensers, including secure retail displays for products with bottle-necks or similar features (e.g., liquor bottles), or products without bottle necks (e.g., powdered baby formula).

BACKGROUND

In retail stores, many products are stocked openly and freely on shelves, making them visible and accessible to customers. While ideal for allowing the maximum opportunity for a customer to consider a product for purchase, products are also susceptible to theft. To combat this, especially with more expensive products, a store may place those products behind a counter or within a display cabinet that requires the assistance of a store employee to access the products. Other systems exist wherein products are tethered to a shelf and must be released by a store employee for purchase. As a result of cabinets, counters, tethered systems, and the like, customer access to the products is limited and the shopping experience and likelihood of purchase is diminished.

Another method of preventing theft of products is placing more expensive products on higher shelves, leaving less costly products to lower shelves. For example, in a liquor store, expensive liquors are frequently placed on the top shelf, while less expensive liquors are placed on lower shelves. This practice reduces the likelihood that a customer will purchase the more expensive products, diminishing sales revenue. Furthermore, the liquor bottles still remain openly accessible to a potential thief, who may quickly snatch a bottle and depart without paying or "sweep" many bottles off a shelf at once and run out of the store as fast as possible.

The discussion above is merely provided for general background information and is not intended to be used as an aid in determining the scope of the claimed subject matter.

SUMMARY

An embodiment of a secure product dispenser assembly for holding and dispensing products comprises a base portion and a top portion. The base portion includes a first end and a second end and configured to accept a plurality of units of product. The base portion comprising a first side comprising a first side interface, an opposing second side comprising a second side interface, and a bottom coupled to the first and second sides. A top portion is configured to adjustably couple to the first side interface and the second side interface of the base portion. A dispenser portion is coupled to the top portion and positioned at the first end of the base. A dispensing area is defined by the dispenser portion and the first end of the base. The dispenser portion is configured to rotate between an open position to enable removal of one unit of product from the dispensing area of the base, and a closed position configured to retain and inhibit removal of the one unit of product from the dispensing area of the base. In the open position, the dispenser portion inhibits removal of more than one unit of product. The dispenser portion comprises a plurality of surface features configured to interact with one or more catch elements to enable incremental rotation of the dispenser portion.

The base portion is configured to accept a plurality of units of product and defining a dispensing area at a first end. The base portion further comprises a first side comprising a first side interface, an opposing second side comprising a second side interface, and a bottom side coupled to the first and second sides. The top portion is configured to adjustably couple to first side interface and the second side interface of the base portion. A dispenser portion is coupled to the top portion and positioned above the dispensing area. The dispenser portion is configured to rotate between an open position to enable removal of one unit of product from the dispensing area of the base, and a closed position configured to retain and inhibit removal of the one unit of product from the dispensing area of the base. In the open position, the dispenser portion inhibits removal of more than one unit of product. The dispenser portion further comprises a plurality of surface features configured to interact with one or more catch elements to enable incremental rotation of the dispenser portion.

In an embodiment, the secure product dispenser assembly includes a lock assembly with a lock member. The lock member may be moved to enable the lock assembly to switch between a loading position and a dispensing position. When in the loading position, the lock assembly holds the dispensing portion in the open position such that units of product can be loaded into the secure product assembly from the first end of the base.

In another embodiment, a secure product dispenser assembly comprises a base portion having a first end and a second end, and being configured to hold a plurality of units of product. The base portion comprises a bottom, a first divider coupled to the bottom, and a second divider positioned opposite the first divider and coupled the bottom. A top portion is configured to adjustably couple to the base portion and a dispenser portion is coupled to the top portion and positioned at the first end of the base portion. The dispenser portion is configured to rotate between an open position to enable removal of one unit of product from the first end of the base, and a closed position inhibiting removal of the one unit of product from the first end of the base.

Additional features and advantages of the present disclosure are described in, and will be apparent from, the following Brief Description of the Drawings and Detailed Description.

BRIEF DESCRIPTION OF THE DRAWINGS

So that the manner in which the features of the invention can be understood, a detailed description of the invention may be had by reference to certain exemplary embodiments, some of which are illustrated in the accompanying drawings. It is to be noted, however, that the drawings illustrate only certain exemplary embodiments of this invention and are therefore not to be considered limiting of its scope, for the scope of the invention encompasses other equally effective embodiments. The drawings are not necessarily to scale, emphasis generally being placed upon illustrating the features of certain exemplary embodiments of the invention. In the drawings, like numerals are used to indicate like parts throughout the various views. Thus, for further understanding of the invention, reference can be made to the following detailed description, read in connection with the drawings.

FIG. 29A illustrates a close-up view of a coupling element of an embodiment of the secure product dispenser assembly.

FIG. 29B illustrates a right side perspective view of an embodiment of the secure product dispenser assembly.

FIG. 30A illustrates a top perspective view of an embodiment of a secure product dispenser configured to couple to adjacent secure product dispensers.

FIG. 30B illustrates a close-up view of the embodiment of FIG. 30A.

DESCRIPTION OF THE INVENTION

The following discussion relates to various embodiments of a reusable surface cover with integrated elements. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "periphery", "interior", "exterior", "front", "back", "inner", "external", "top", "bottom", and the like are not intended to limit these concepts, except where so specifically indicated. With regard to the drawings, their purpose is to depict salient features of the disclosed subject matter and are not specifically provided to scale.

Figure 1A:
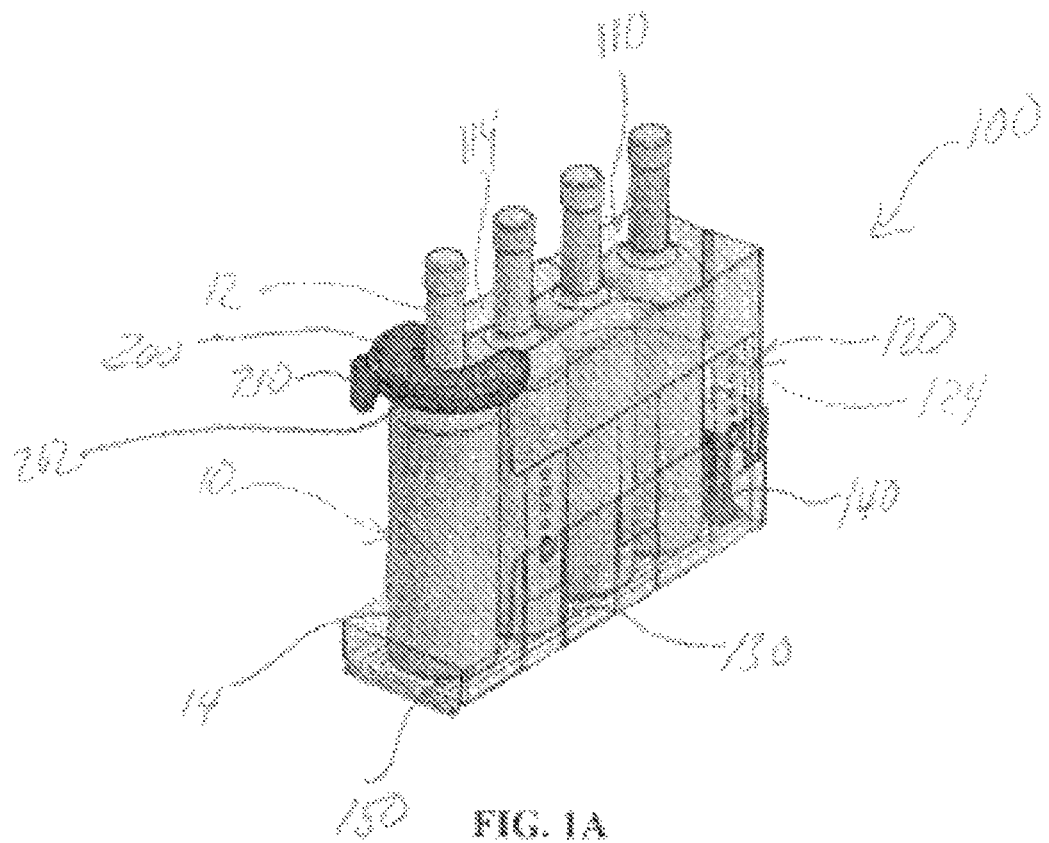
FIG. 1A is a perspective view of an exemplary embodiment of a secure product dispenser assembly with products loaded into the assembly and shown in the closed position.
Figure 1B:
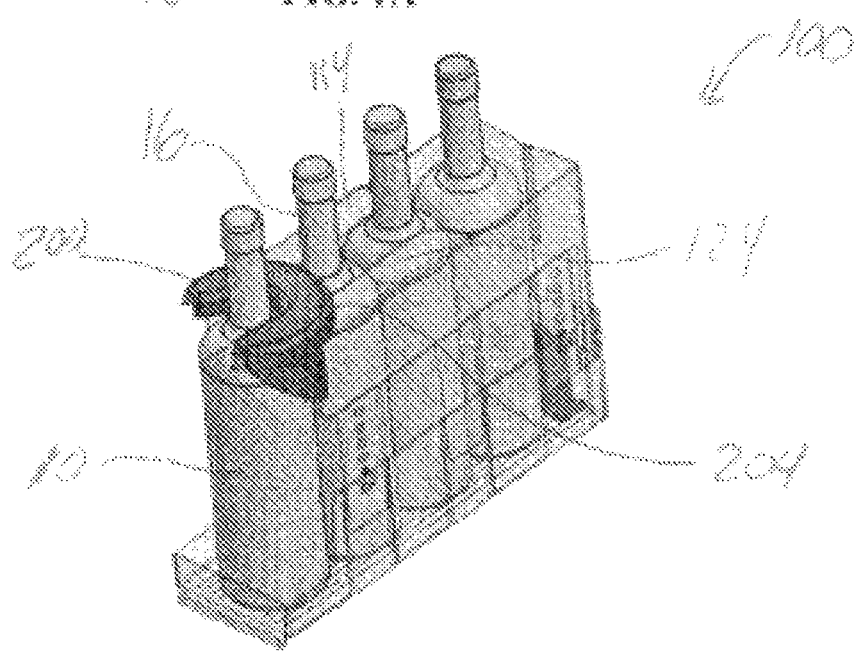
FIG. 1B is a perspective view of the secure product dispenser assembly of FIG. 1A with products loaded into the assembly and shown in the open position.
Figure 2:
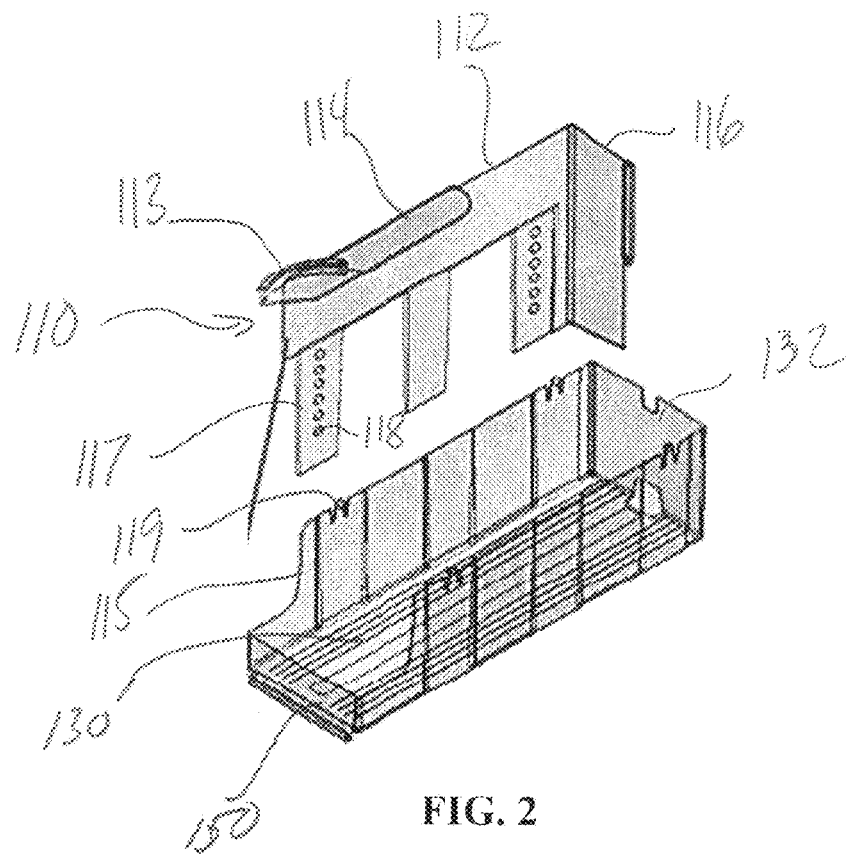
FIG. 2 is a perspective view of the secure product dispenser assembly of FIG. 1A highlighting the features of the first (left) divider.
Figure 3:
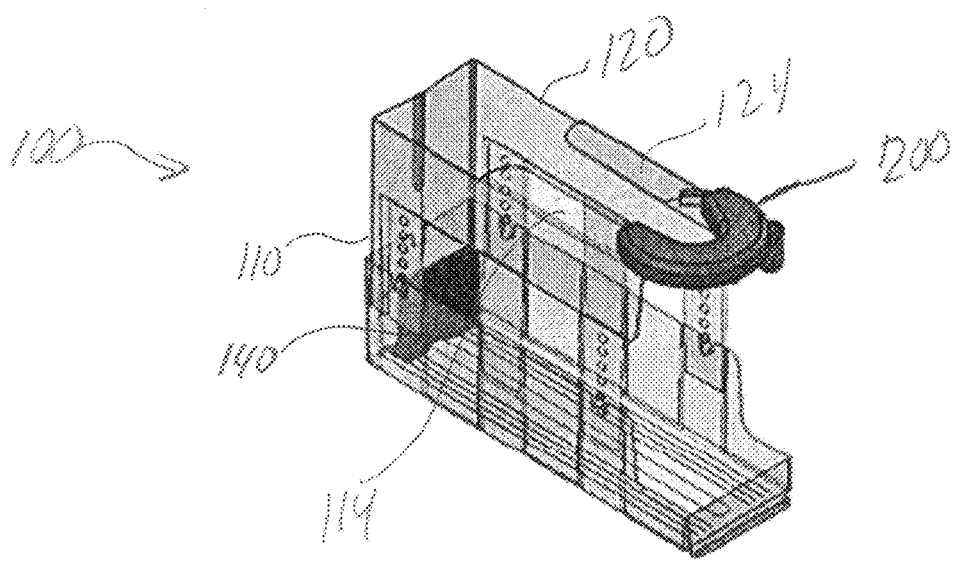
FIG. 3 is a perspective view of the secure product dispenser assembly of FIG. 1 without products loaded into the assembly and shown in the closed position.

FIG. 1A is a perspective view of an exemplary embodiment of a secure product dispenser assembly 100 with products 10, 16 loaded into the assembly 100 and shown in the closed position. FIG. 1B is a perspective view of the secure product dispenser assembly 100 of FIG. 1A with products 10, 16 loaded into the assembly and shown in the open position. FIG. 2 is a perspective view of the secure product dispenser assembly 100 of FIG. 1A highlighting the features of the first (left) divider 110. FIG. 3 is a perspective view of the secure product dispenser assembly 100 of FIG. 1 without products loaded into the assembly 100 and shown in the closed position.

As can be seen in these figures, the exemplary embodiment of the secure product dispenser assembly 100 allows products (e.g., a first product having a neck 12 and a base 14 and a second product 16) to be loaded into a retail display for viewing and access by the customer. The exemplary secure product dispenser assembly 100 includes a first (left) divider 110, a second (right) divider 120, a base or tray 130 that also includes a base back portion or a tray back portion 132 and a facing 150, e.g., on which can be mounted a label or price tag. In some exemplary embodiments, a pushing element such as a spring pusher 140 can be used in the tray 130 to push products 10, 16 forward when a product is dispensed. In other exemplary embodiments, the tray 130 of the secure product dispenser assembly 100 can be titled such that gravitational forces can move the products 10, 16 forward without a pusher 140.

Since each of the dividers 110, 120 have substantially the same features, the following discussion and the Figures illustrate those features of the first (left) divider 110. For example, the exemplary first (left) divider 110 can be injection molded from a clear material and includes a divider top portion 112, a divider bottom portion 114, and a divider back portion 116. As can be seen best in FIG. 2, the divider bottom portion 114 can be formed as part of the tray 130.

Figure 6:
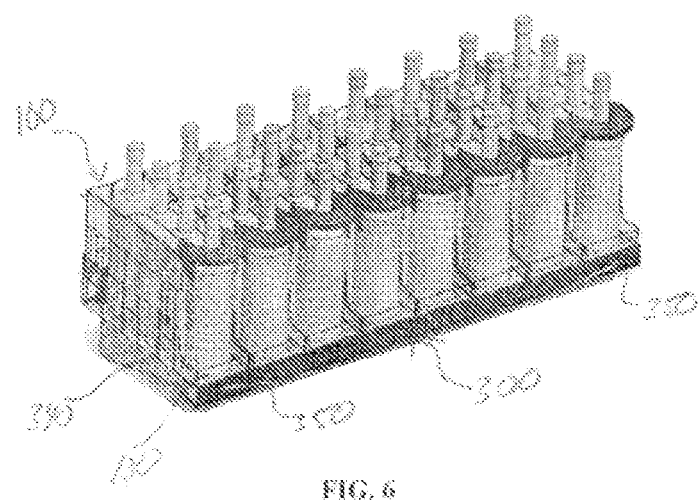
FIG. 6 is a perspective view of multiple secure product dispenser assemblies secured by a locking assembly.

Each of the dividers 110, 120 are adjustable in height to accommodate products with different heights. For example, the dividers 110, 120 can be pre-configured for a particular product height or can be adjusted in the store to accommodate a particular product height. As shown in FIG. 6, multiple secure product dispenser assemblies 100 can be arranged side-by-side. And although FIG. 6 shows an example where all of the products are the same and have the same height, it will be understood each of the dividers 110, 120 of each of the secure product dispenser assemblies 100 can be adjusted separately to accommodate different product heights.

In one example design to provide this height adjustability, the exemplary first (left) divider 110 also includes a divider adjustable height interface 117 that includes a plurality of holes 118 that can mate with a ball-pin 119 located on the divider bottom portion 115. For example, to set the first (left) divider 110 at the lowest height, the divider adjustable height interface 117 would be inserted into the divider bottom portion 115 until the ball-pin 119 was inserted into the upper or highest hole 118 on the divider adjustable height interface 117. On the other hand, to set the first (left) divider 110 at the highest height, the divider adjustable height interface 117 would be inserted into the divider bottom portion 115 until the ball-pin 119 was inserted into the lower or lowest hole 118 on the divider adjustable height interface 117.

Figure 8A:
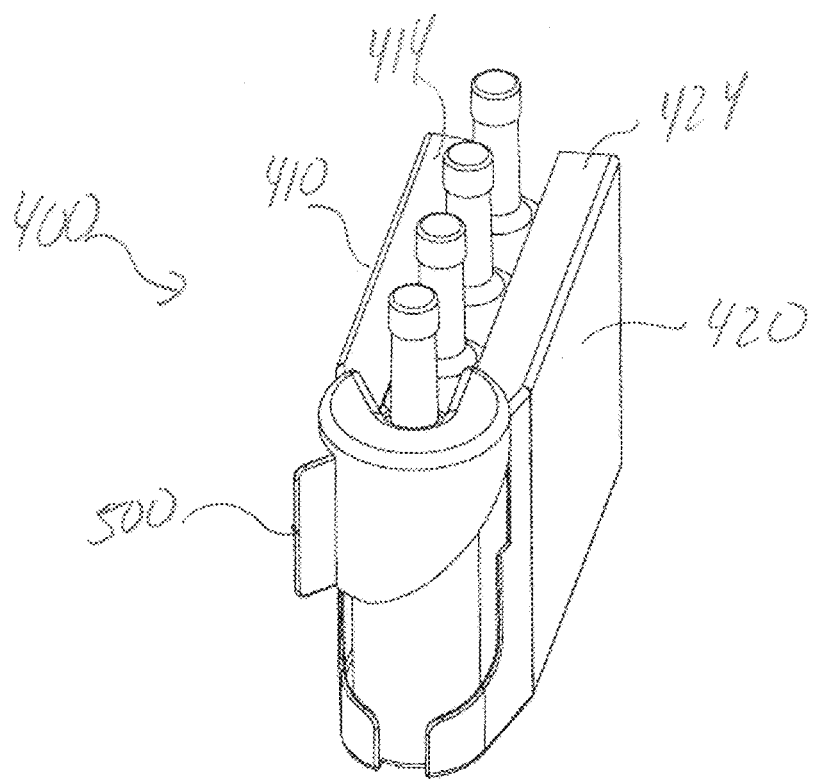
FIG. 8A is a perspective view of another exemplary embodiment of a secure product dispenser assembly with products loaded into the assembly and shown in the closed position.
Figure 8B:
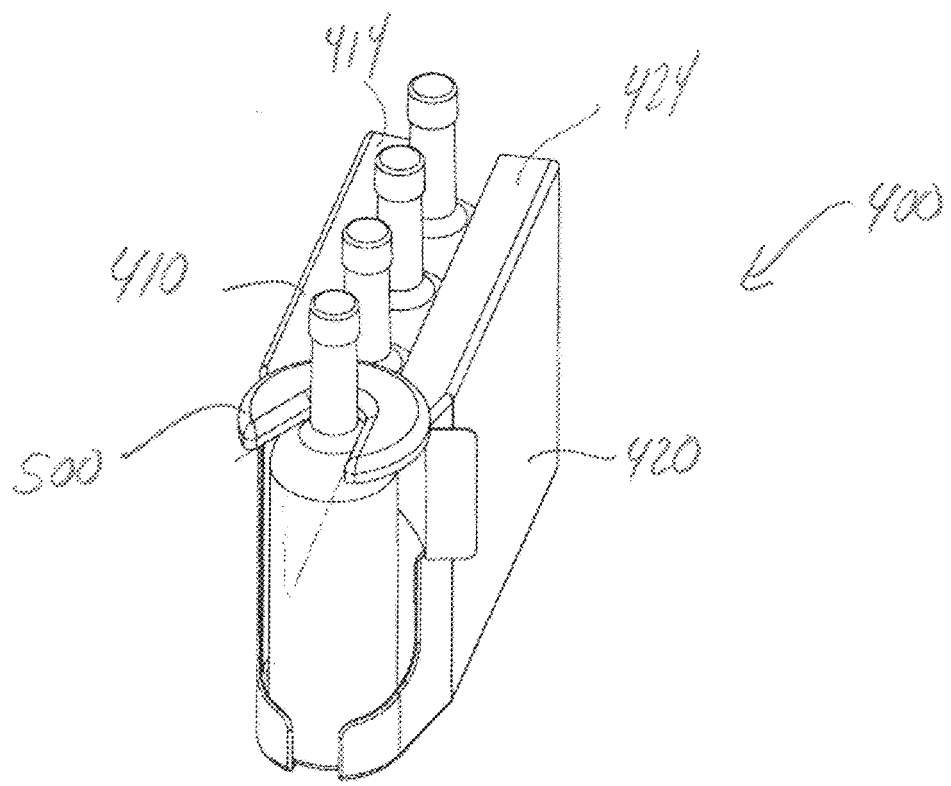
FIG. 8B is a perspective view of the secure product dispenser assembly of FIG. 8A with products loaded into the assembly and shown in the open position.
Figure 9:
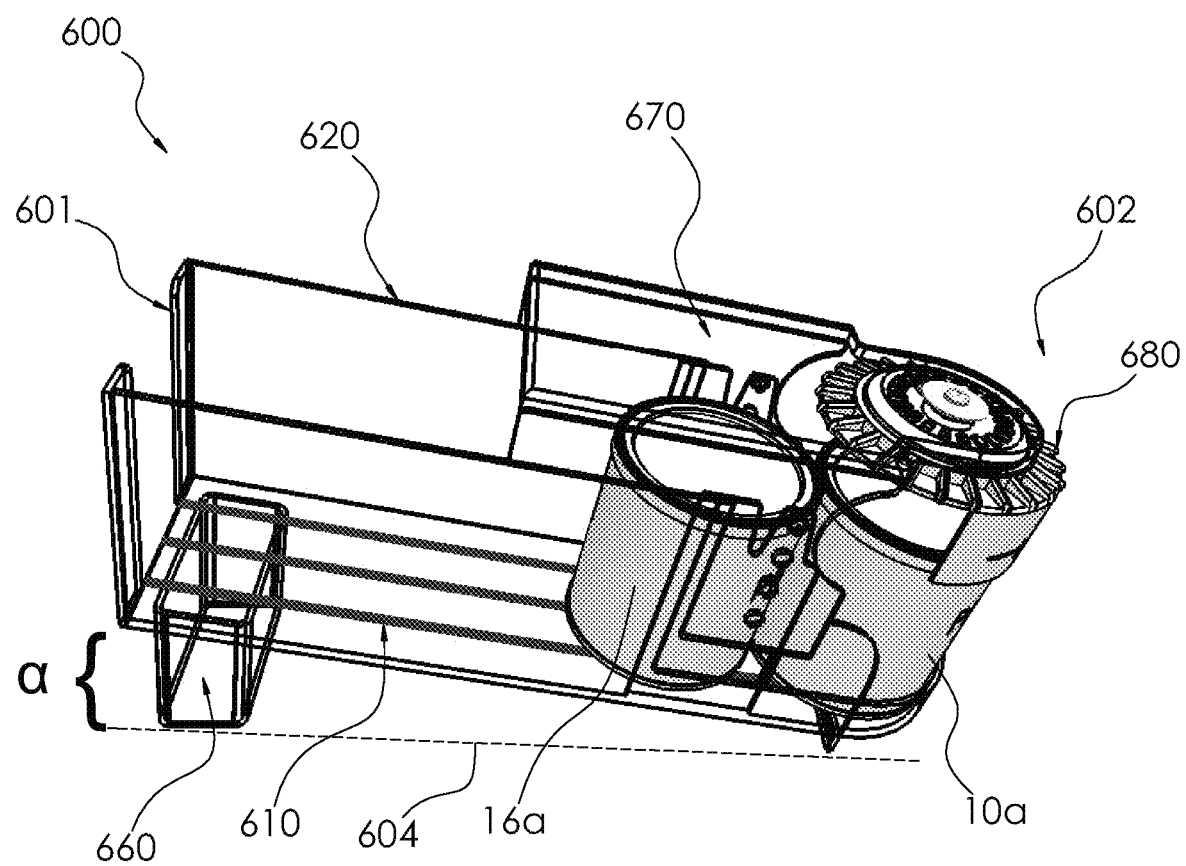
FIG. 9 is a perspective view of another embodiment of the secure product dispenser assembly loaded with two product units.

The exemplary first (left) divider 110 also includes at least a partial covering configured to extend between a top of the first divider 110 and a top of the second divider 120. As shown, the partial covering is a divider lip 114 or rail that is positioned above the bottle-neck 12 of the product 10 (along with the similarly positioned divider lip 124 of the second (right) divider 120) to prevent the product 10 from being lifted vertically out of the exemplary secure product dispenser assembly 100. As shown, the covering and at least one of the first divider 110 and the second divider 120 may be formed as a single component. In this example, the divider lips 114, 124 only extend for a portion of the length or depth of the secure product dispenser assembly 100, leaving space for at least one product 10 to be loaded into the back of the secure product dispenser assembly 100 if necessary. In other exemplary embodiments (e.g., where front or some other loading was used), the divider lips 414, 424 of the dividers 410, 420 could extend for the entire the length or depth of the secure product dispenser assembly 400 as shown in FIGS. 8A and 8B.

The exemplary first (left) divider 110 also includes a security dispensing handle mount 113 for receiving and mounting to the security dispensing handle 200, which, in one exemplary embodiment, is injected molded from an opaque material to include a one-way snap fit connection to the security dispensing handle mounts 113 of both dividers 110, 120 so that the security dispensing handle 200 cannot be removed from the dividers 110, 120 without breaking the security dispensing handle 200 or the dividers 110, 120.

As seen in FIGS. 1A, 3, and 6, when the security dispensing handle 200 is in the home or closed position, the product 10 cannot be removed from the secure product dispenser assembly 100 the security dispensing handle 200 prevents the product 10 from being pulled forward. The product 10 contacts the inner ring 202 of the security dispensing handle 200 preventing the product 10 from moving forward.

As shown in FIG. 1B, when the security dispensing handle 200 is rotated (e.g., using its gripping element 210) to the open position (e.g., in clockwise direction), the first product 10 in the row of products can be removed from the secure product dispenser assembly 100, but the security dispensing handle 200 and the divider lips 114, 124 prevent any products 16 from being removed from the secure product dispenser assembly 100 while the security dispensing handle 200 returns to its home or closed position. The second product 16 contacts the outer ring 204 of the security dispensing handle 200 preventing the preventing the next product 16 from moving forward. In this way, the security dispensing handle 200 only permits the removal of a single product 10 at a time from the secure product dispenser assembly 100.

Figure 4:
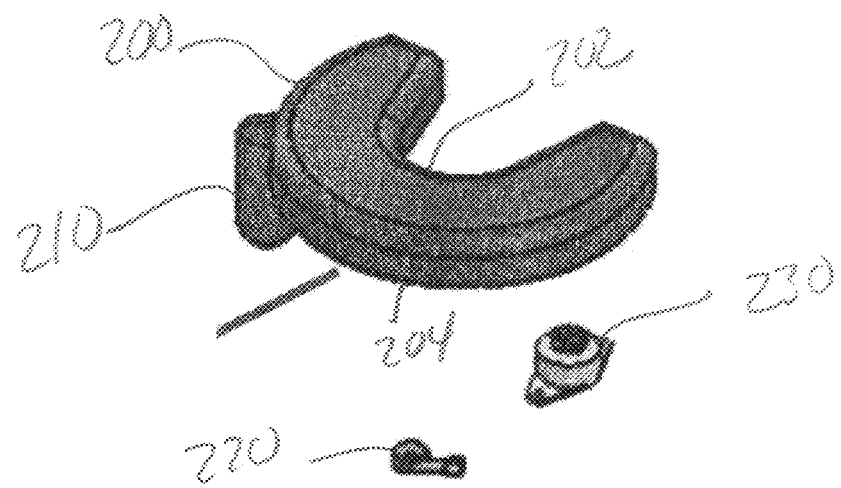
FIG. 4 is an exploded view of an exemplary embodiment of the security dispensing handle along with the spring mechanism and gear mechanism.
Figure 5:
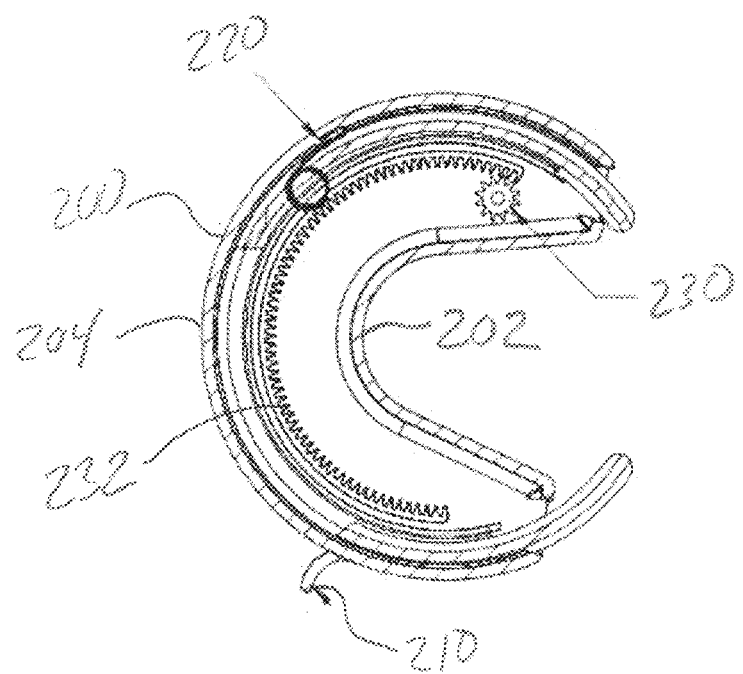
FIG. 5 is an underside view of the security dispensing handle of FIG. 5.

FIG. 4 is an exploded view of an exemplary embodiment of the security dispensing handle 200 along with the spring mechanism 220 and gear mechanism 230. FIG. 5 is an underside view of the security dispensing handle 200 of FIG. 5. It will be understood, that the shape and size of the exemplary embodiment of the security dispensing handle 200 shown in FIGS. 1A-6 can be changed depending on the application. For example, as shown in FIGS. 8A and 8B, another exemplary embodiment of the security dispensing handle 500 can have a larger surface area (and can even run the full length of the product) that might allow the addition of graphics or tags to the security dispensing handle 500.

As will be explained, by controlling (e.g., dampening) the speed at which the security dispensing handle 200 returns from its open position (shown in FIG. 1A) to its home or closed position (shown in FIG. 1B), the secure product dispenser assembly 100 prevents a customer from rapidly grabbing multiple products at the same time or in succession.

In one exemplary embodiment, the spring mechanism 220 is a spring with one end fixedly attached to one of the dividers (e.g., the second (right) divider 120) and the other end attached to the underside (e.g., a hook) of the security dispensing handle 200. When the security dispensing handle 200 is in the home or closed position (shown in FIG. 1A), the spring mechanism 220 is in a low tension (or compressed) state. When the security dispensing handle 200 is rotated from the closed position (shown in FIG. 1A) to the open position (shown in FIG. 1B), the spring mechanism 220 is stretched or extended, increasing the tension on the spring as the security dispensing handle 200 is opened and increasing the force in the opposite direction trying to close the security dispensing handle 200. Without any gear mechanism 230, the spring mechanism 220 would cause the security dispensing handle 200 to quickly return to the closed position and allow the customer to then quickly open the security dispensing handle 200 to remove another product 16.

In one exemplary embodiment, the gear mechanism 230 comprises an oil gear mounted to one of the dividers (e.g., the second (right) divider 120) that interfaces with a teeth rack 232 molded or otherwise mounted on the underside of the security dispensing handle 200. When the security dispensing handle 200 is rotated from the closed position (shown in FIG. 1A) to the open position (shown in FIG. 1B), the teeth of teeth rack 232 are allowed to roll over the teeth of the gear mechanism 230 without resistance from the gear mechanism 230. It will be understood that mechanical gearing (e.g., gearing molded as part of the security dispensing handle 200 using coupling of gears with different diameters interacting with each other) could also be used. In one embodiment, one-way teeth can be used in the teeth rack 232 to avoid rotating the gear mechanism 230 when rotating from the closed position to the open position. When the security dispensing handle 200 is released from the open position and, based on force of the spring mechanism 220, tries to rotate back to the home or closed position, the teeth rack 232 engages with the gear mechanism 230 that provides resistance to and dampens the speed at which the security dispensing handle 200 rotates back to the closed position, delaying that process to take, e.g., several seconds (e.g., 2, 5, 10, 20, 30, 40, 50, 60 seconds, etc. depending on the application). This slow return from open to the home or closed position prevents rapid grabbing of multiple products 10, 16. The security dispensing handle 200 also forces the customer to use two hands (one to operate the security dispensing handle 200 and one to grab the product 10, 16), which can prevent rapid grabbing of multiple products 10, 16.

Figures 7A, 7B:
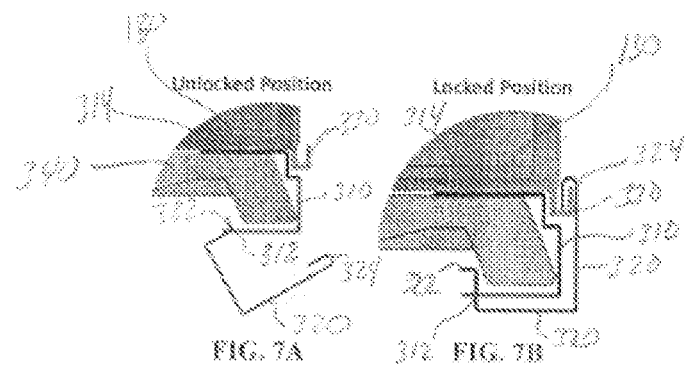
FIG. 7A is a sectional view of the locking assembly of FIG. 6 shown in the unlocked position.
FIG. 7B is a sectional view of the locking assembly of FIG. 6 shown in the locked position.

FIG. 6 is a perspective view of multiple secure product dispenser assemblies 100 secured by a locking assembly 300. FIG. 7A is a sectional view of the locking assembly 300 of FIG. 6 shown in the unlocked position. FIG. 7B is a sectional view of the locking assembly 300 of FIG. 6 shown in the locked position.

In one exemplary embodiment, in order to prevent the unauthorized removal of the secure product dispenser assemblies 100 from the shelf 340 (e.g., gondola shelf) on which it sits, a locking assembly 300 comprising a first locking rail 310 and a second locking rail 320 is employed. In one embodiment, the locking rails 310, 320 are sheet metal parts. As will be explained, in one exemplary embodiment, the first locking rail 310 is fastened to the shelf 340, the second locking rail 320, is interlocked with the first locking rail 310 and the secure product dispenser assemblies 100, and the two locking rails 310, 320 are locked together by one or more locks 350 (e.g., cam locks) effectively locking the secure product dispenser assemblies 100 to the shelf 340 and preventing removal.

In one exemplary embodiment, the secure product dispenser assemblies 100 include a hook 330 molded into, e.g., the tray 130. One end of the first locking rail 310 sits flat on and is fastened (e.g., with hardware) to the top of the shelf 340 beneath the tray and the shelf 340. This first locking rail 310 then wraps around and below the front part of the shelf 340. The second end of the locking rail 310 can include slots 312 that will be used to interface with and provide a hinge for the second locking rail 320. One end of the second locking rail 320 includes a hook 324 that is shaped to mate and lock with the hook 330 formed as part of the secure product dispenser assemblies 100 in the locked position. The second end of the second locking rail 320 includes teeth 322 that can be inserted through the slots 312 of the first locking rail 310, interlocking the two locking rails 310, 320 together and forming a hinge connection.

As shown in FIG. 7A, in the unlocked position, the second locking rail 320 can be swung down below the shelf 340 and out of the way of the secure product dispenser assemblies 100, allowing the secure product dispenser assemblies 100 to be removed from the shelf 340. As shown in FIG. 7B, in the locked position, the hook 324 of the second locking rail 320 is secured onto the hook 330 formed as part of the secure product dispenser assemblies 100. In this locked position, the secure product dispenser assemblies 100 are prevented from being removed from the shelf by the second locking rail 320, which can be locked to the first locking rail 310 using the one or more locks 350, preventing the hooks 324, 330 from being separated. To allow removal of the secure product dispenser assemblies 100, the cam locks 350 need to be unlocked and the hook 324 of the second locking rail 320 is removed from the hook 330 of the secure product dispenser assemblies 100. In another exemplary embodiment, the secure product dispenser assemblies 100 could be secured together by dovetailing and tying their trays together so a thief could not remove just a single secure product dispenser assembly 100. Alternatively, another locking rail system could be incorporated as part of the trays and not to the shelf.

Another embodiment of the secure product dispenser assembly 600 is shown in FIGS. 9-17. In the embodiments shown, the components of the secure product dispenser assembly 600 are comprised of a transparent material. One or more components of the secured product dispenser assembly 600 may be formed as a single unit using injection molding or other manufacturing techniques. As shown, the secure product dispenser assembly 600 generally comprises a base portion 605 and a top portion 670. The base portion 605 includes a first (left) divider 610, a second (right) divider 620, a tray 630 with a tray back portion 640 and a dispensing area 650 at least partially defined by a facing 651 at a first end of the base portion 605. The facing 651 may be configured or otherwise sized to allow a label, tag, or other indicator may be affixed thereto. An extension 660 may project from a bottom surface 631 of one end of the tray 630 to tilt the tray 630 to enable gravitational forces to move the products 10a, 16a from one end of the tray 630 to the other as products 10a, 16a are removed from the secured product dispenser assembly 600. In another embodiment, a spring-loaded pusher is configured to advance additional units of product towards the dispensing area 650 to replace units of product being dispensed to customers.

Figure 10:
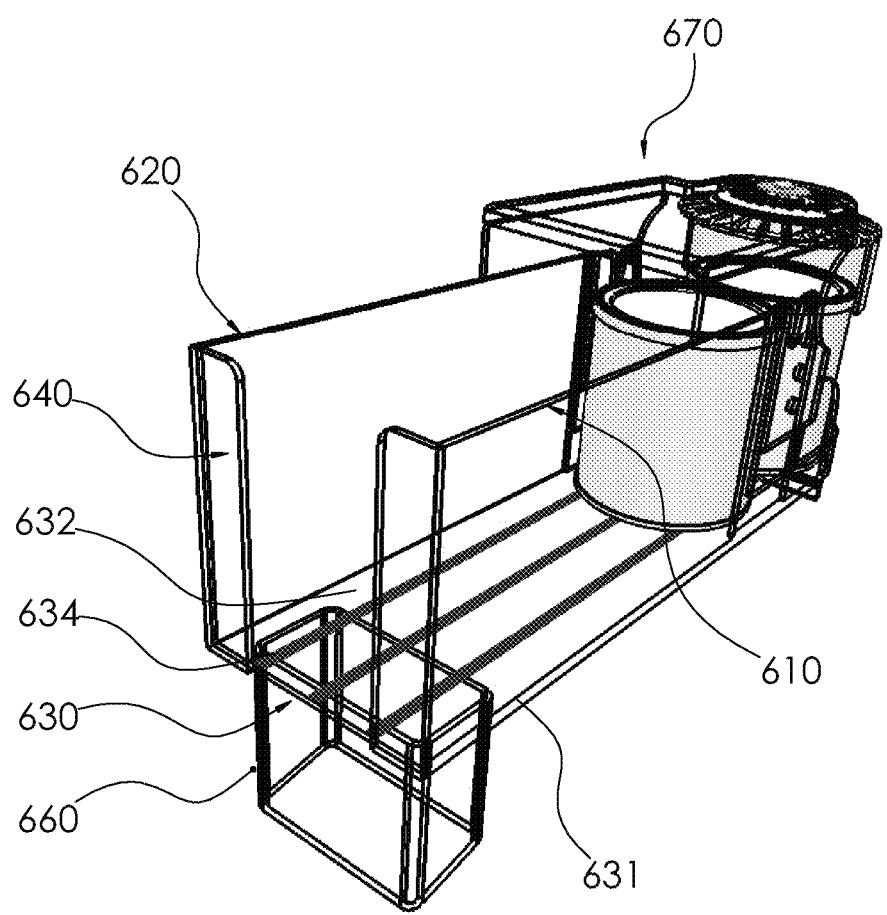
FIG. 10 is a rear perspective view of the embodiment of the secure product dispenser assembly of FIG. 9.
Figure 14:
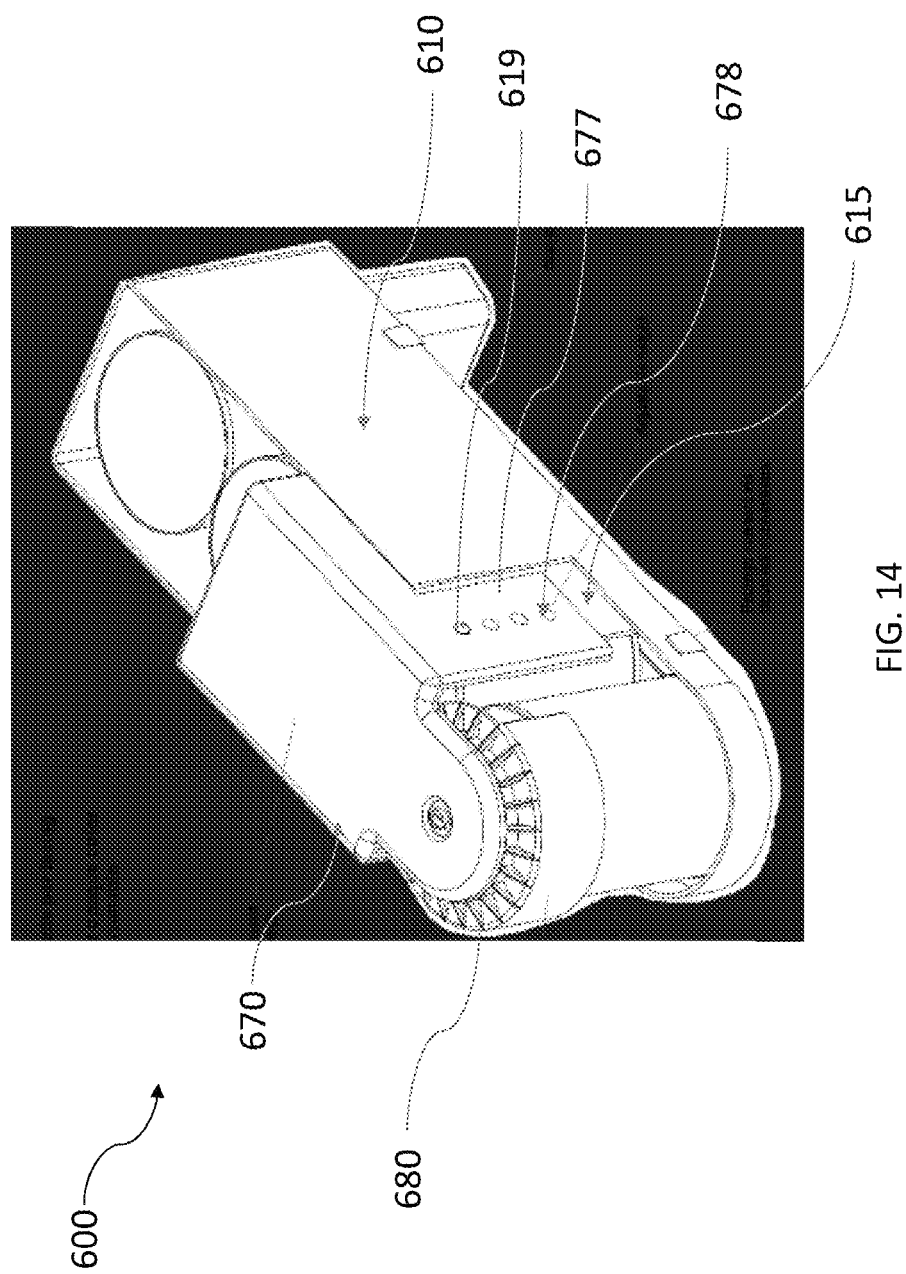
FIG. 14 is a top perspective view of an embodiment of the secure product dispenser assembly of FIG. 9.
Figure 15:
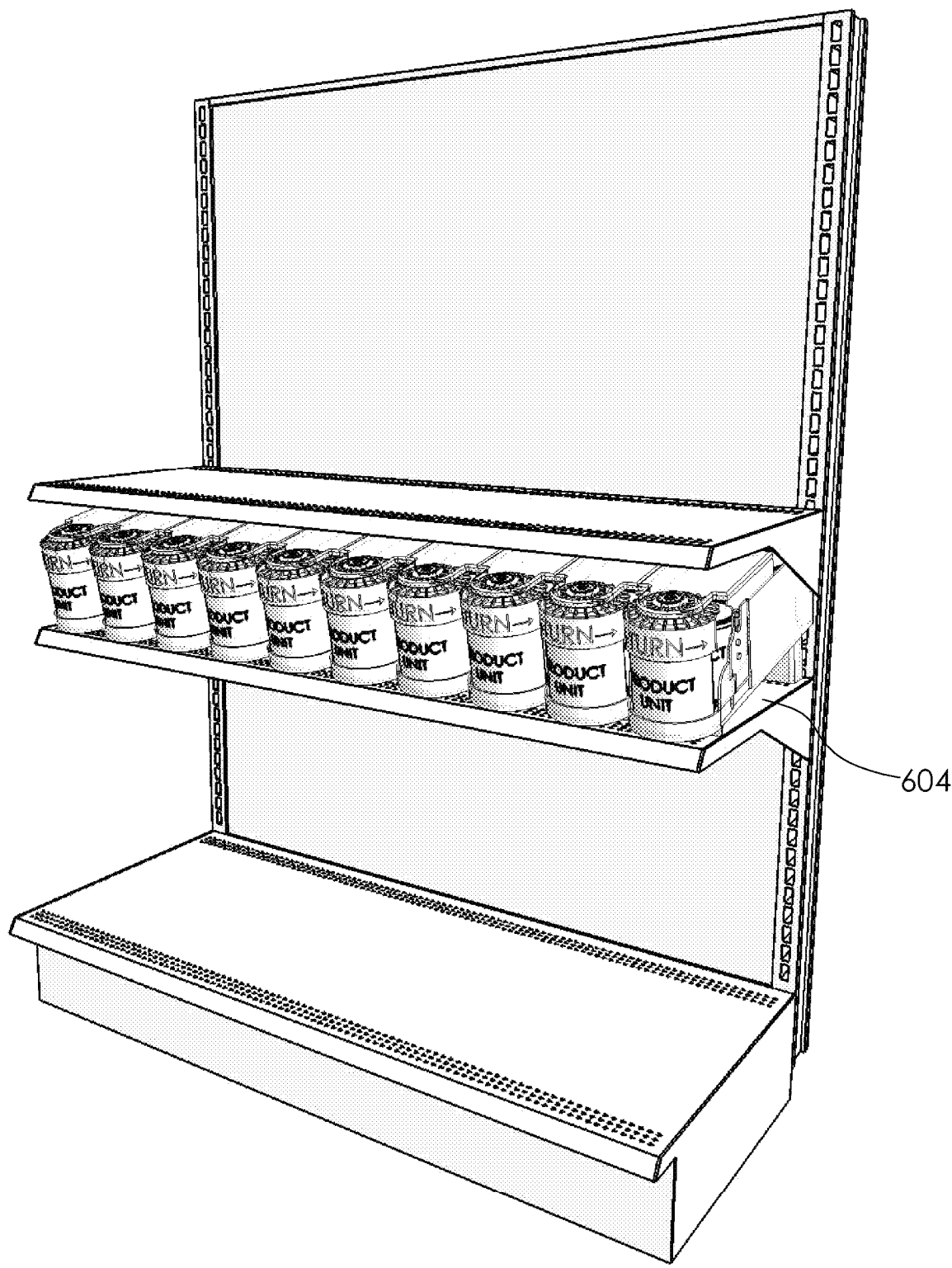
FIG. 15 illustrates a plurality of the secure product dispenser assembly of FIG. 9 arranged side-by-side on a display shelf.
Figure 16:
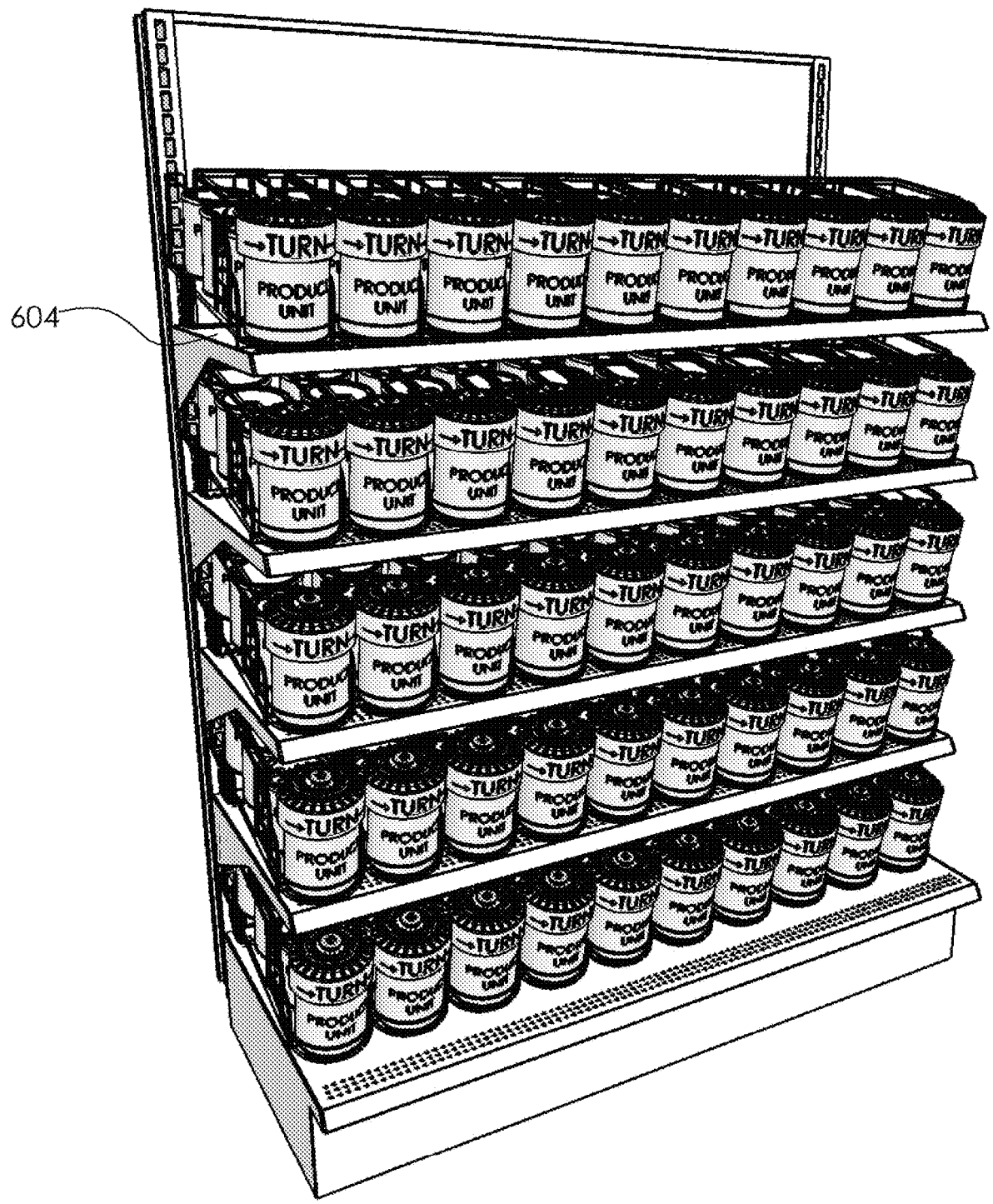
FIG. 16 illustrates a plurality of the secure product dispenser assembly of FIG. 9 arranged side-by-side on a multiple display shelves.
Figure 17:
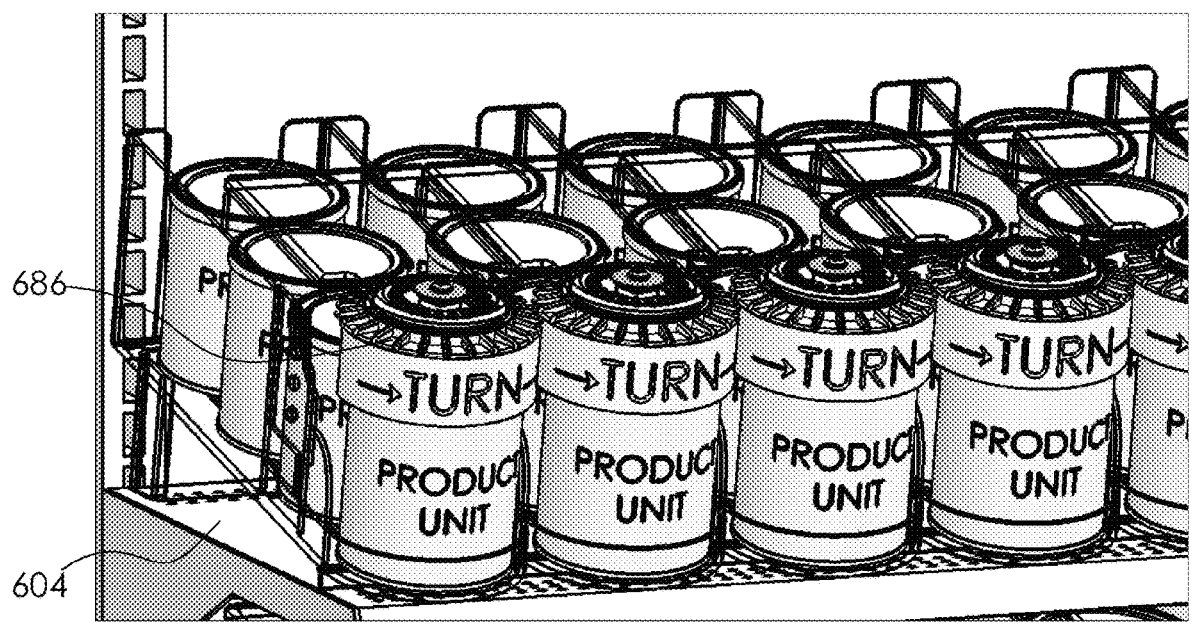
FIG. 17 illustrates a close up of some of the plurality of the secure product dispenser assemblies from FIGS. 15 and 16.

As shown in FIGS. 9 and 14-17, the extension 660 is configured to lift a back end 601 of the tray 630 relative to the front end 602 or first end of the tray 630 such that the tray 630 is positioned at an angle α relative to a display surface 604 (FIGS. 15-17). The tray 630 may further comprise a top tray surface 632 and one or more friction reduction elements 634. As shown in FIG. 10, the friction reduction elements 634 are raised rails configured to elevate the products 10a, 16a from the top tray surface 632 thereby decreasing the surface friction between the top tray surface 632 and the products 10a, 16a. The decreased surface friction allows the products 10a, 16a to move more freely along the tray 630 when being dispensed. In another embodiment, the friction reduction elements may comprise one or more grooves in the top tray surface 632 that are configured to reduce he surface friction between the top tray surface 632 and the products 10a, 16a.

The first and second dividers 610, 620 may have substantially the same features as the first and second dividers of other embodiments of the secure product dispenser assembly 100, 400. In an embodiment, the first and second dividers 610, 620 and the tray 630 are formed as a single component. In another embodiment, the first and second dividers 610, 620 may be configured to adjust in height in order to accommodate products of varying heights. The height of the first and second dividers 610, 620 may be adjusted according to any of the embodiments previously discussed. Multiple secure product dispenser assemblies 600 may be arranged side-by-side on a display surface 604 or shelve in order to securely display and dispense a variety of products. Referring to FIGS. 15-17, multiple secure product dispenser assemblies 600 are arranged side-by-side on a display shelf 604 such as would be used in a grocery store or pharmacy.

A covering is configured to extend at least partially between the first and second dividers 610, 620. As shown, a top portion 670 is configured to extend between and couple to the first and second dividers 610, 620 and cover the tray 630, however in other embodiments the covering may be similar to the lip 124 previously discussed. As shown, the top portion 670 does not extend along the entire length of the first and second dividers 610, 620, and in an exemplary embodiment, the top portion 670 covers at least the front end 602 of the tray 630 to prevent products 10a, 16a from being vertically removed from the secure product dispenser assembly 600. In an embodiment, the top portion 670 may be configured to be disengaged from the first and second dividers 610, 620 in order to assist in the loading of product 10a, 16a. In an embodiment the top portion 670 may be configured to be locked into engagement with the first and second 610, 620 dividers to prevent disengagement.

Figure 11:
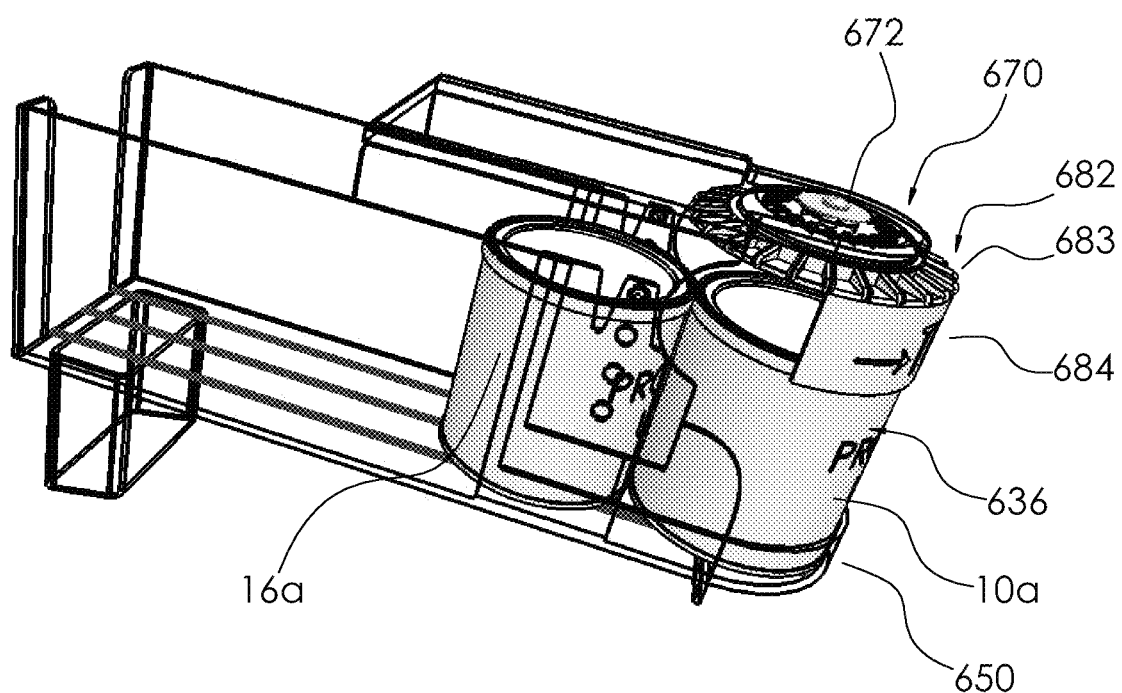
FIG. 11 is a front perspective view of an embodiment of a dispensing handle of the secure product dispenser assembly of FIG. 9 in a closed position.
Figure 12:
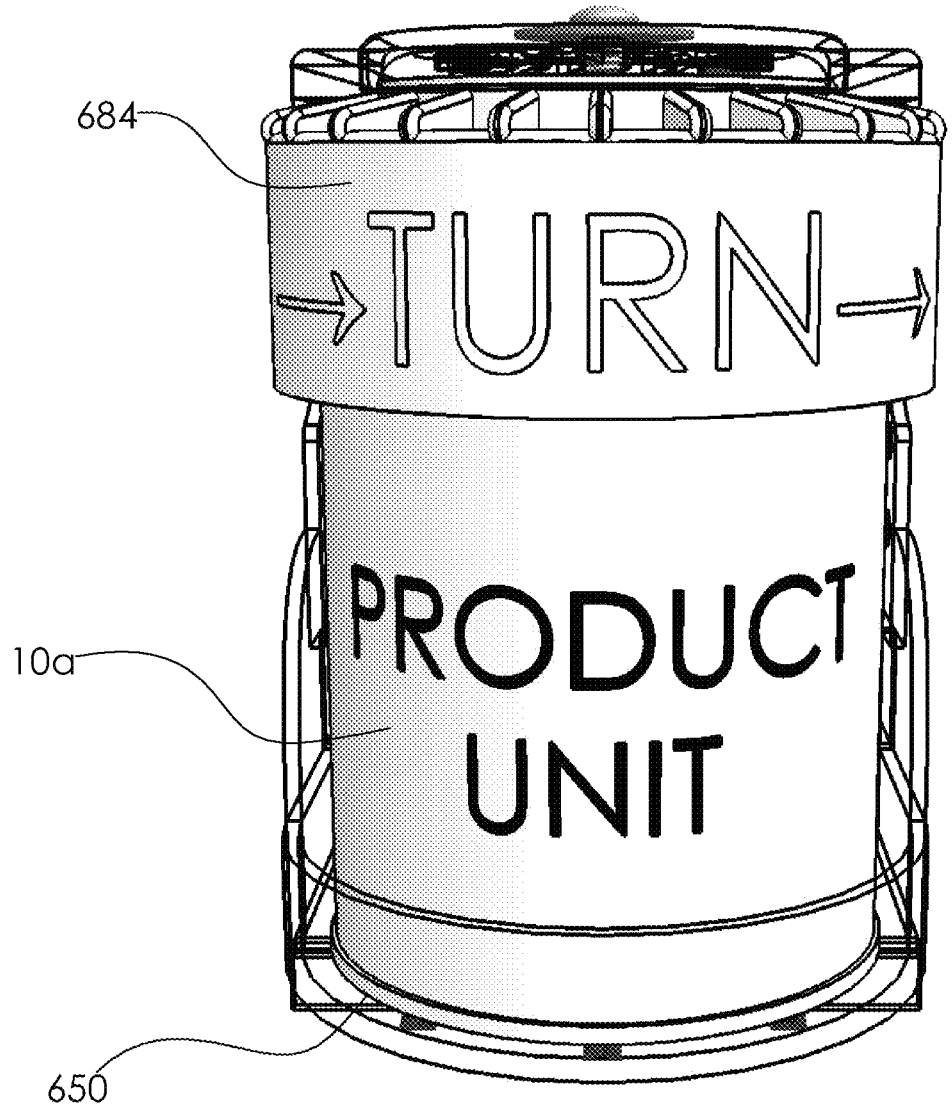
FIG. 12 is a close-up front perspective view of the embodiment of the secure product dispenser assembly of FIG. 11.
Figure 13:
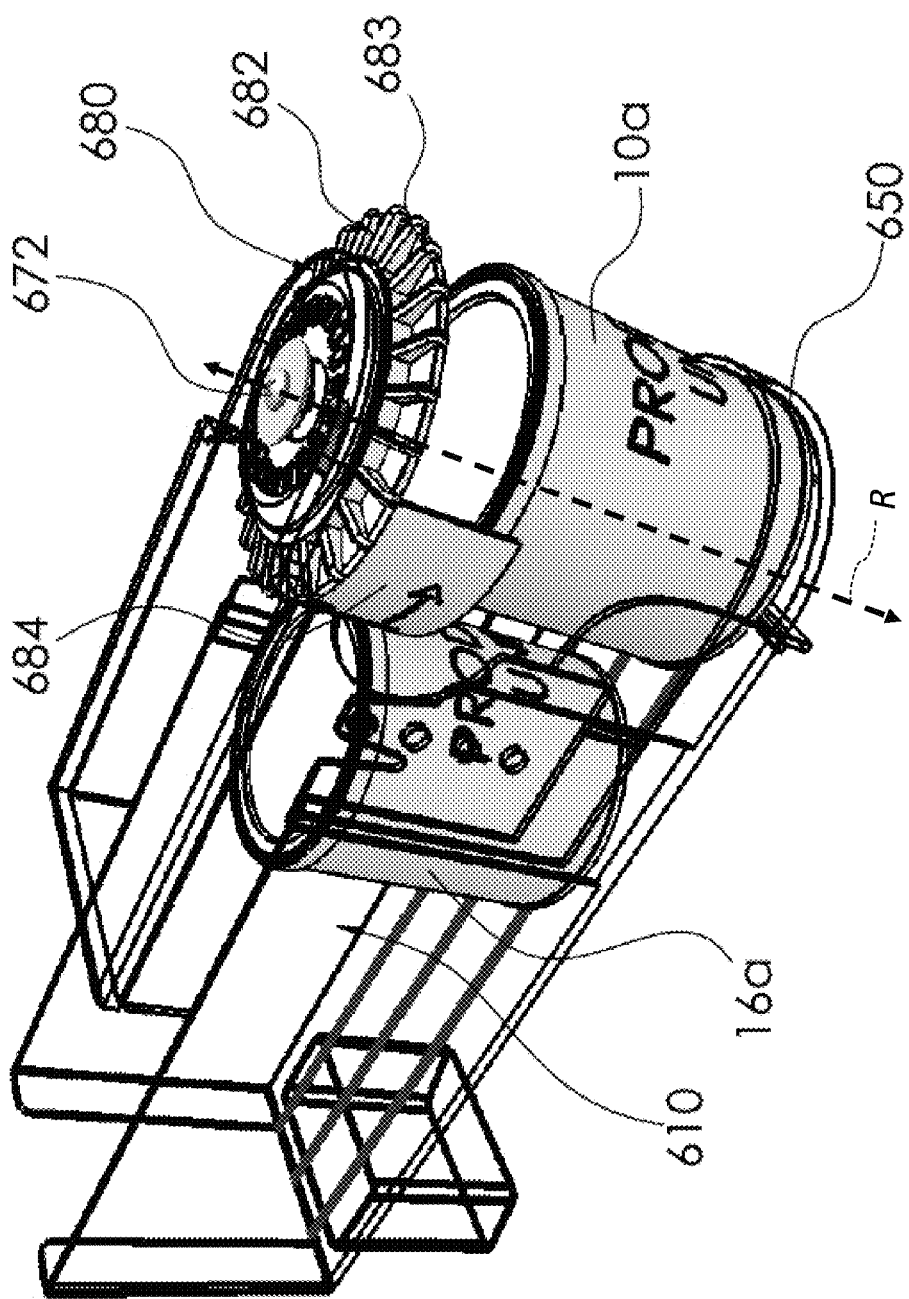
FIG. 13 is a close-up front perspective view of the embodiment of a dispensing handle of FIG. 11 in a dispensing position or open position.

Referring to FIGS. 11-12, and 14 the top portion 670 further comprises a security dispenser handle coupler 672 that is configured to receive and pivotally couple a security dispensing handle 680. In an embodiment, the security dispensing handle 680 is injection molded from a transparent or opaque material to include a one-way snap-fit connection with the top portion 670 so that the security dispensing handle 680 cannot be removed from the top portion 670. In another embodiment the security dispenser handle coupler 672 may comprise a separate fastener. As shown, the security dispensing handle 680 comprises a top surface 682 defining a plurality of surface features 683, such as teeth. The surface features 683 are configured to engage one or more catch elements (not shown) positioned on the top portion 670. The security dispensing handle 680 further comprises a lip 684. As shown in FIGS. 11-13, the security dispensing handle 680 comprises a substantially circular shape and lip 684 extends partially around the circumference of the security dispensing handle 680. In a preferred embodiment, the lip 684 extends around approximately half of the circumference of the security dispensing handle 680.

Referring still to FIGS. 11-12, the secure product dispenser assembly 600 is depicted in the closed position such that the top portion 670, the first and second dividers 610, 620, the lip 684, and the facing 651 all act to prevent removal of the products 10a, 16a from the first end 602 of the tray 630 of the secure product dispenser assembly 600. In the closed position, the products 10a, 16a may be confined within the secure product dispenser assembly 600. As shown, the lip 684 is configured to contact and otherwise aid in retaining the top portion of the product 10a. Referring specifically to A4, the security dispensing handle 680 may comprise a grasp, knob, dial 686, or other feature configured to assist a customer or user in moving the secure product dispenser assembly 600 between an open and closed position. In the embodiment shown, in the closed position, the products 10a, 16a are prevented from being removed or added at the front 602 end of the tray 630, while at the same time the products 10a, 16a may be removed and/or added at the back end 601 of the tray 630. When the secure product dispenser is installed onto a display shelf, the back end 601 of the tray 630 is inaccessible and products are only able to be accessed from the front end 602 of the tray 630. Installation of the secure product dispenser assembly 600 may comprise coupling or otherwise securing one or more components of the secure product dispenser assembly 600 to the display surface 604 or display shelf.

Referring to FIG. 13, the secure product dispenser assembly 600 is depicted in the open position. Rotation of the security dispensing handle 680 about an axis of rotation R (FIG. 13) rotates the lip 684 such that the product 10a can be removed from the dispensing position 636 of the front end 602 of the tray 630. The rotation of the lip 684 thereby prevents removal of product 16a, which is retained by the lip 684, the top portion 670, the tray 630, and the first and second dividers 610, 620. In the open position, only the product positioned in the dispensing position 636 (FIG. 11) may be removed from the secure product dispenser 600. In an embodiment, the rotation of the security dispensing handle 680 may cause interaction between the plurality of surface features 683 and the one or more catch elements (not shown) in order to enable incremental movement of the security dispensing handle 680. The interaction may also create an audible sound, such as a clicking noise, as the security dispensing handle 680 is rotated in order to draw attention and discourage tampering with the secure product dispenser assembly 600.

Rotation of the security dispensing handle 680 back to the closed position depicted in FIGS. 11-12 allows the next unit of product 16a to move or slide along the tray 630 and into the dispensing position 636. In the embodiments shown, the secure product dispenser assembly 600 is reloaded with product by decoupling from the display surface or display shelf in order to remove the secure product dispenser assembly 600 to expose the back end 601 of the tray 630. Products may be loaded or unloaded from the back end 601 of the tray 630. In other embodiments, the interior space of the secure product dispenser assembly 600 may not be accessible without removal of one or more components.

In an embodiment, the top portion 670 may be configured to be adjusted relative to the first and second dividers or sides 610, 620. The embodiment illustrated in FIG. 14 provides height adjustability. The top portion 670 includes an adjustable height interface 677 that includes a plurality of holes 678 that can mate with a ball-pin 619 located on a divider or side interface. For example, to set the first (left) divider 610 at the lowest height, the adjustable height interface 677 would be inserted into the first divider interface 615 until the ball-pin 619 was inserted into the upper or highest hole 678 on the adjustable height interface 677. On the other hand, to set the first (left) divider 610 at the highest height, the adjustable height interface 677 would be inserted into the first divider interface 615 until the ball-pin 619 was inserted into the lower or lowest hole 678 on the adjustable height interface 677. In this embodiment, the second side or divider 620 may be adjusted in a similar manner at the second divider interface 625.

Referring to FIG. 13, the secure product dispenser assembly 600 is depicted in the open position. Rotation of the security dispensing handle 680 about an axis of rotation R (FIG. 13) rotates the lip 684 such that the product 10a can be removed from the dispensing position 636 of the front end 602 of the tray 630. The rotation of the lip 684 thereby prevents removal of product 16*a*, which is retained by the lip 684, the top portion 670, the tray 630, and the first and second dividers 610, 620. In the open position, only the product positioned in the dispensing position 636 (FIG. 11) may be removed from the secure product dispenser 600. In an embodiment, the rotation of the security dispensing handle 680 may cause interaction between the plurality of surface features 683 and the one or more catch elements (not shown) in order to enable incremental movement of the security dispensing handle 680. The interaction may also create an audible sound, such as a clicking noise, as the security dispensing handle 680 is rotated in order to draw attention and discourage tampering with the secure product dispenser assembly 600.

Rotation of the security dispensing handle 680 back to the closed position depicted in FIGS. 11-12 allows the next unit of product 16*a* to move or slide along the tray 630 and into the dispensing position 636. In the embodiments shown, the secure product dispenser assembly 600 is reloaded with product by decoupling from the display surface or display shelf in order to remove the secure product dispenser assembly 600 to expose the back end 601 of the tray 630. Products may be loaded or unloaded from the back end 601 of the tray 630. In other embodiments, the interior space of the secure product dispenser assembly 600 may not be accessible without removal of one or more components.

In an embodiment, the top portion 670 may be configured to be adjusted relative to the first and second dividers or sides 610, 620. The embodiment illustrated in FIG. 14 provides height adjustability. The top portion 670 includes an adjustable height interface 677 that includes a plurality of holes 678 that can mate with a ball-pin 619 located on a divider or side interface. For example, to set the first (left) divider 610 at the lowest height, the adjustable height interface 677 would be inserted into the first divider interface 615 until the ball-pin 619 was inserted into the upper or highest hole 678 on the adjustable height interface 677. On the other hand, to set the first (left) divider 610 at the highest height, the adjustable height interface 677 would be inserted into the first divider interface 615 until the ball-pin 619 was inserted into the lower or lowest hole 678 on the adjustable height interface 677. In this embodiment, the second side or divider 620 may be adjusted in a similar manner at the second divider interface 625.

As shown in FIGS. 15-17, multiple secure product dispenser assemblies 600 may be arranged side-by-side on a display surface 604 or shelve in order to securely display and dispense a variety of products. Multiple secure product dispenser assemblies 600 are arranged side-by-side on a display shelf 604 such as would be used in a grocery store or pharmacy.

In an embodiment, the bottom side or tray of any of the secure product dispenser assemblies discloses may comprise a first portion configured to move relative to a second portion to accommodate products a varying width. The configuration of such a bottom side or tray may be similar to any of the adjustable sides or dividers previously disclosed. In another embodiment, the bottom side may comprise a first portion and a second portion. The first portion may be configured to move relative to the second portion such that the first side or divider and second side or divider can be advanced towards or away from each other. In this manner, the secure product dispensing assembly is enabled to accommodate products of varying widths.

Figure 18:
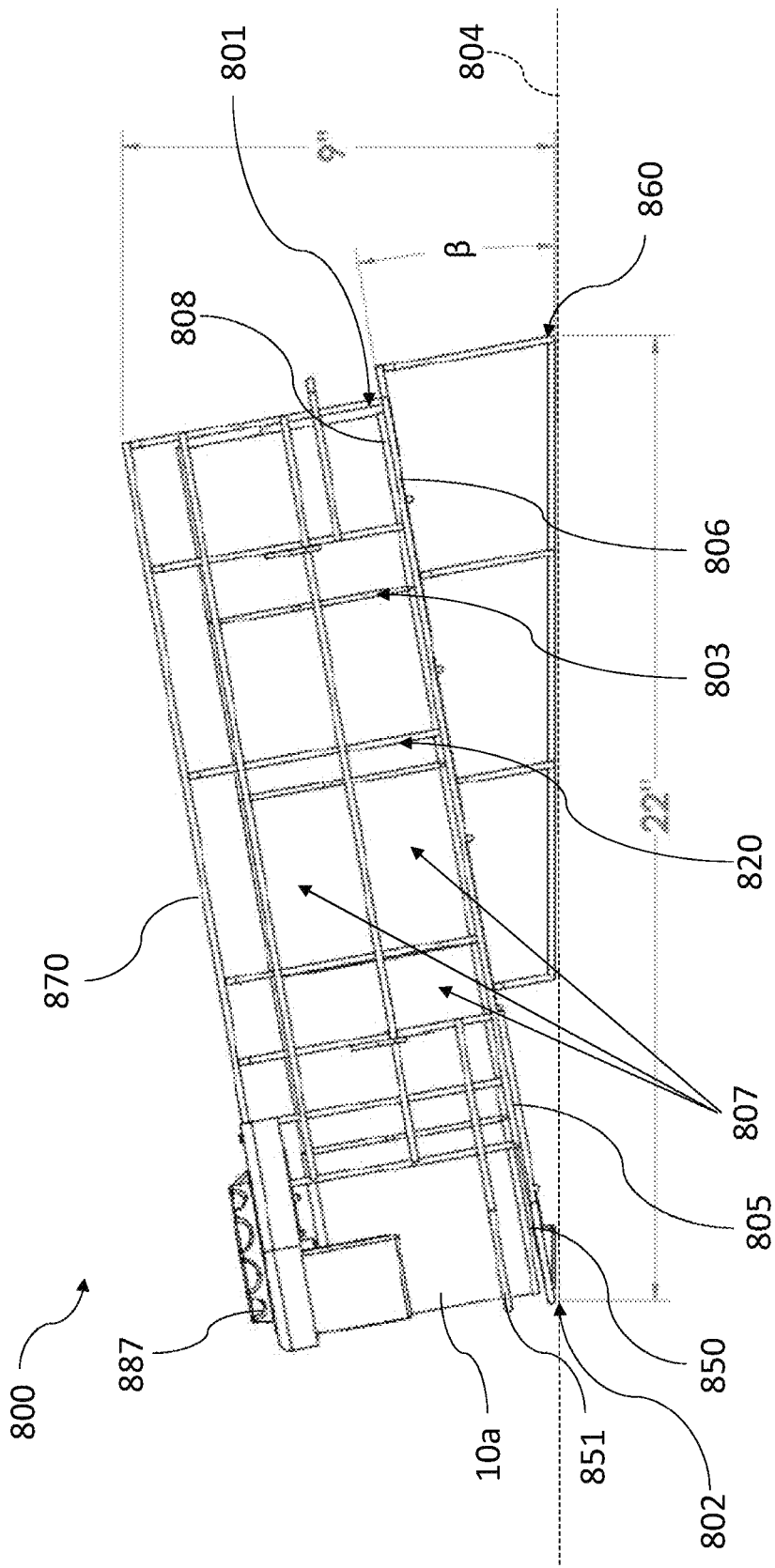
FIG. 18 illustrates a right side perspective view of another embodiment of a secure product dispenser assembly.
Figure 19:
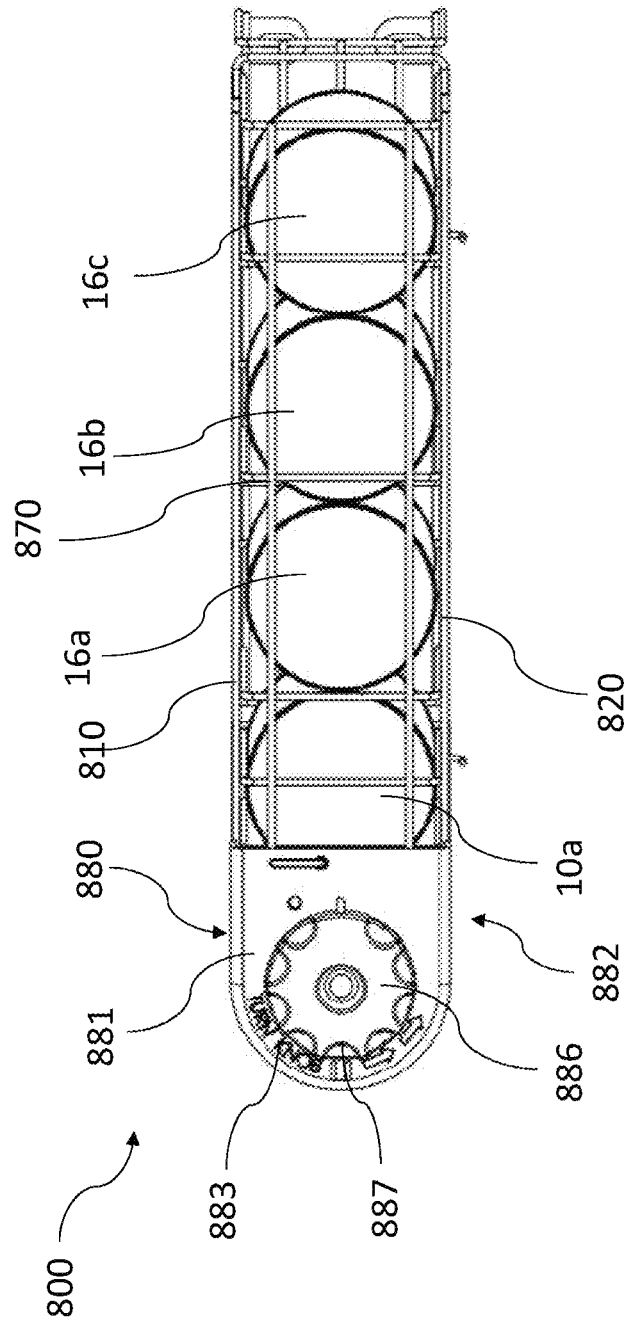
FIG. 19 illustrates a top plan view of the embodiment of the secure product dispenser assembly of FIG. 18.
Figure 20:
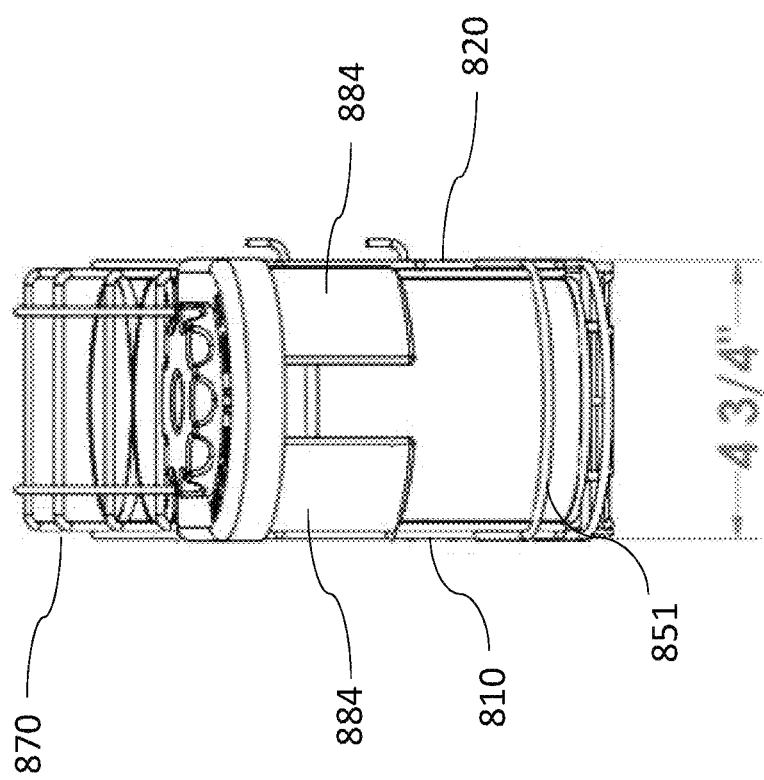
FIG. 20 illustrates a front plan view of the embodiment of the secure product dispenser assembly of FIG. 18.

Turning now to FIGS. 18-20, an embodiment of the secure product dispenser 800 is shown comprised of a plurality of metal wires 803 or rails that form a wire frame defining a plurality of openings 807. The wire frame of this embodiment of the secure product dispenser assembly 800 may form one or more elements that are similar to embodiments previously described, such as a base portion 805 and a top portion 870. In an embodiment, at least a portion of the wire frame may be coated or otherwise treated with one or more substances to inhibit structural degradation from various chemical elements.

Figure 22:
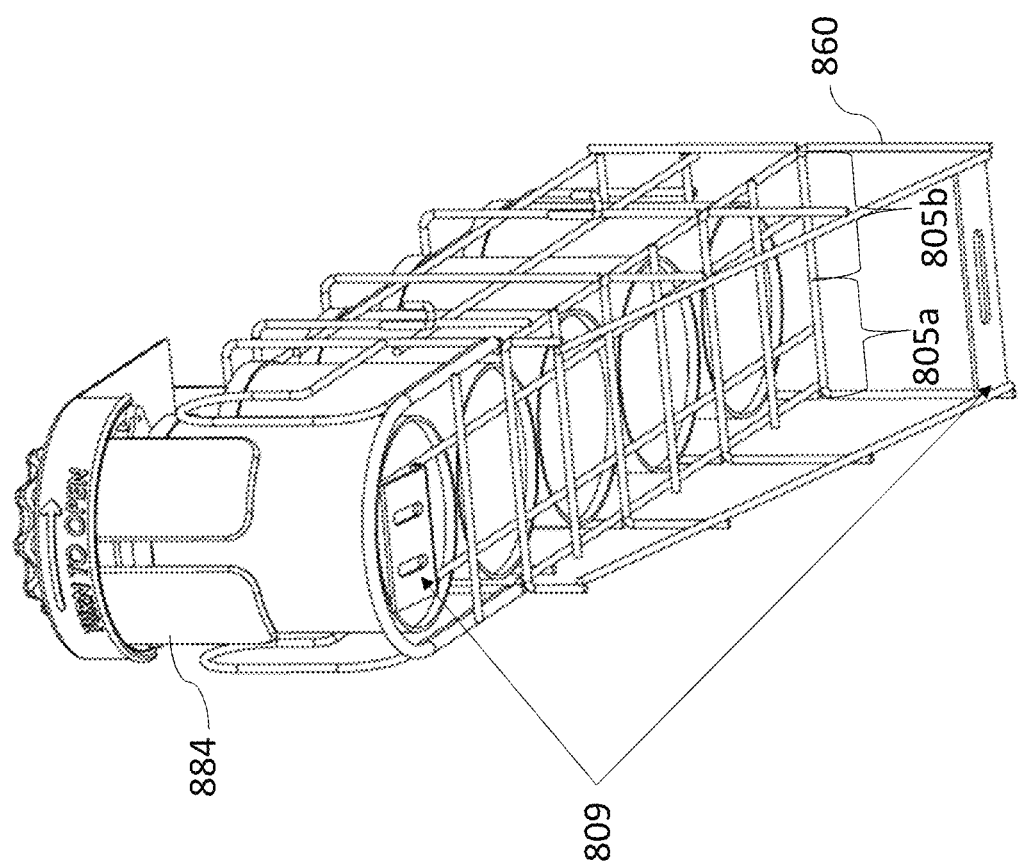
FIG. 22 illustrates a bottom perspective view of an embodiment of the secure product dispenser assembly.
Figure 23:
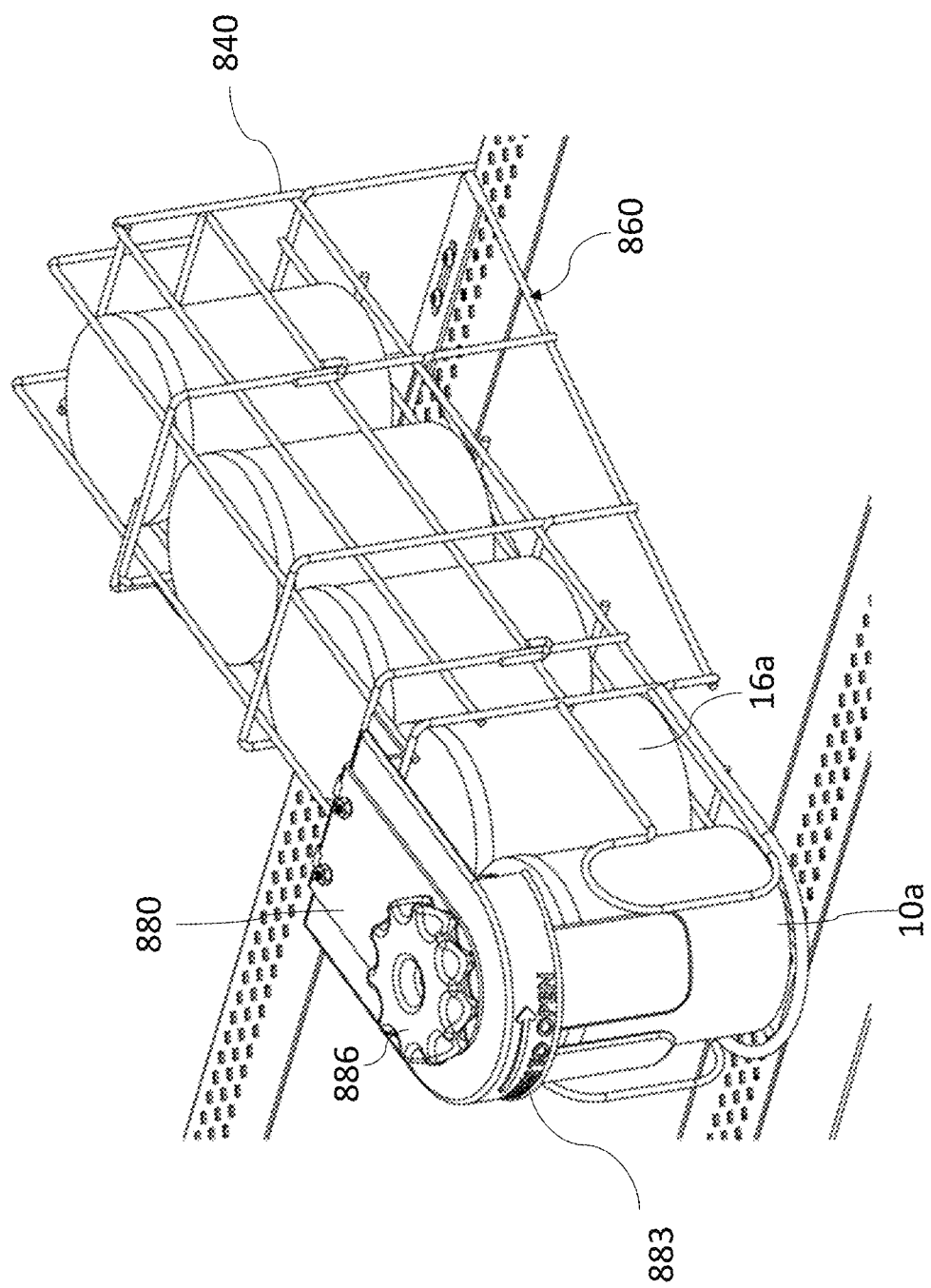
FIG. 23 illustrates a right side perspective view of an embodiment of the secure product dispenser assembly.
Figure 24:
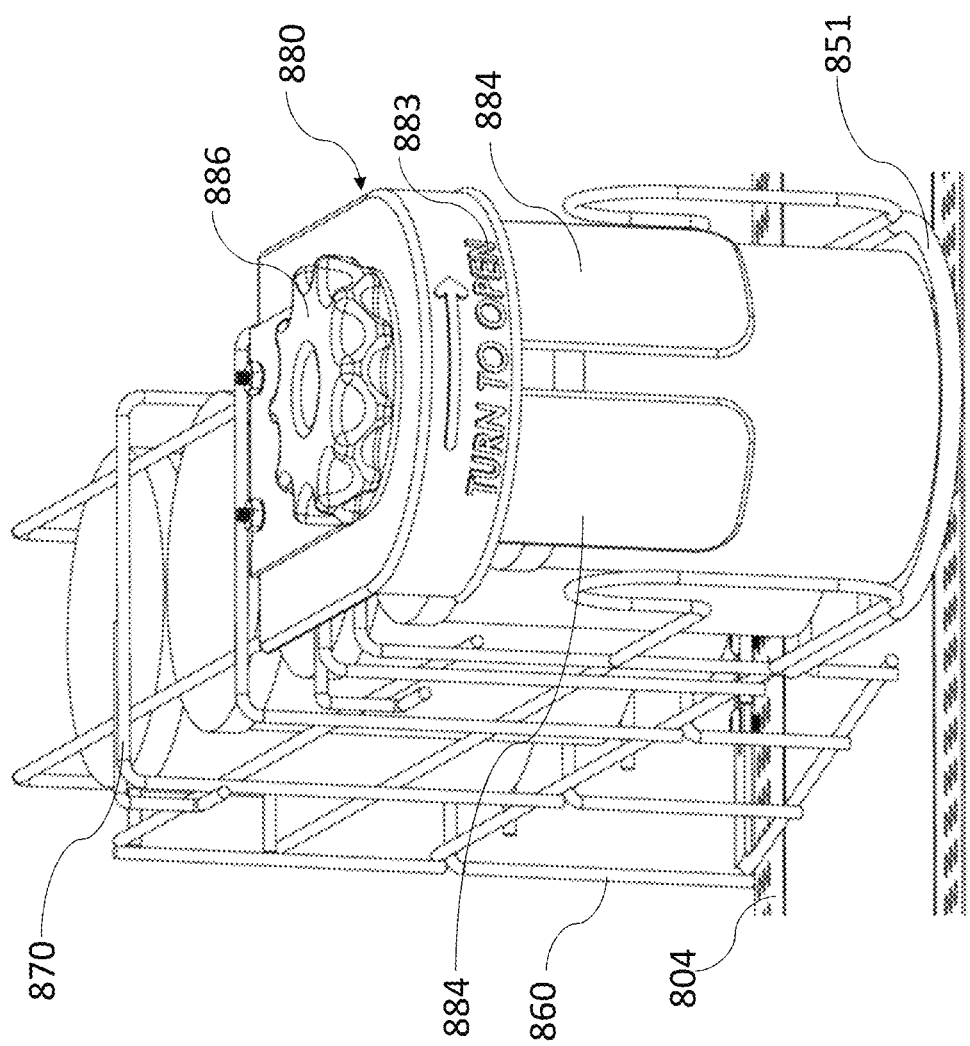
FIG. 24 illustrates a front perspective view of an embodiment of the secure product dispenser assembly.
Figure 25:
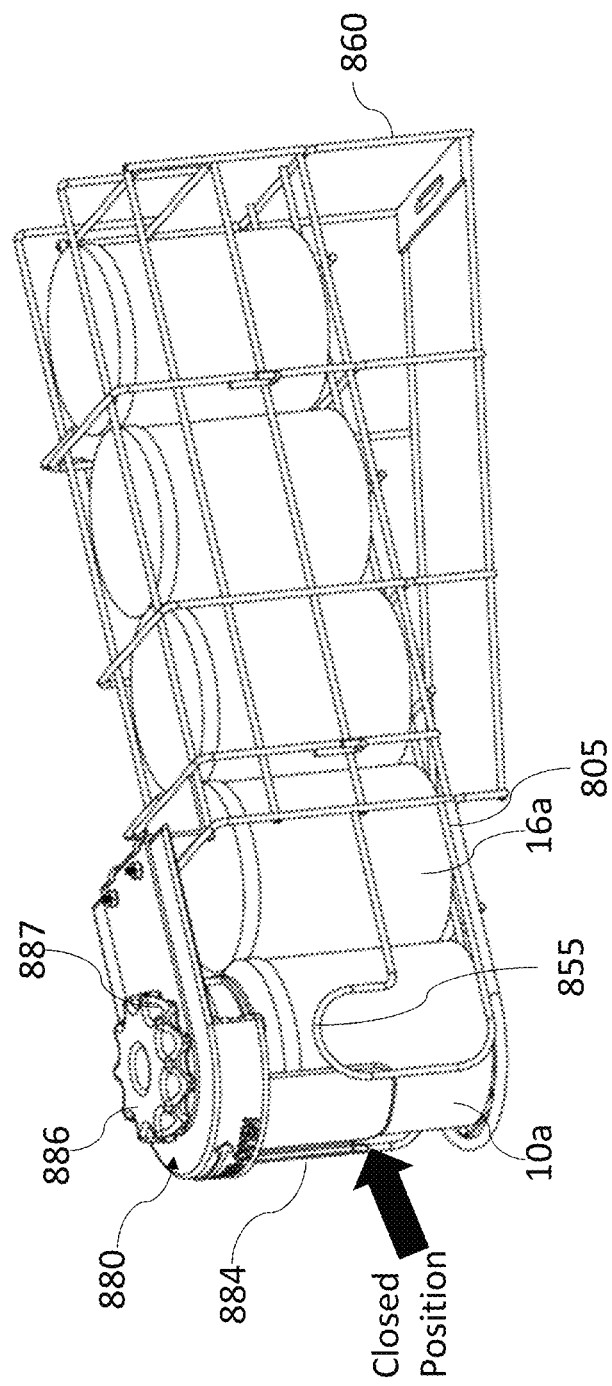
FIG. 25 illustrates a right side perspective view of another embodiment of the secure product dispenser assembly.
Figure 26:
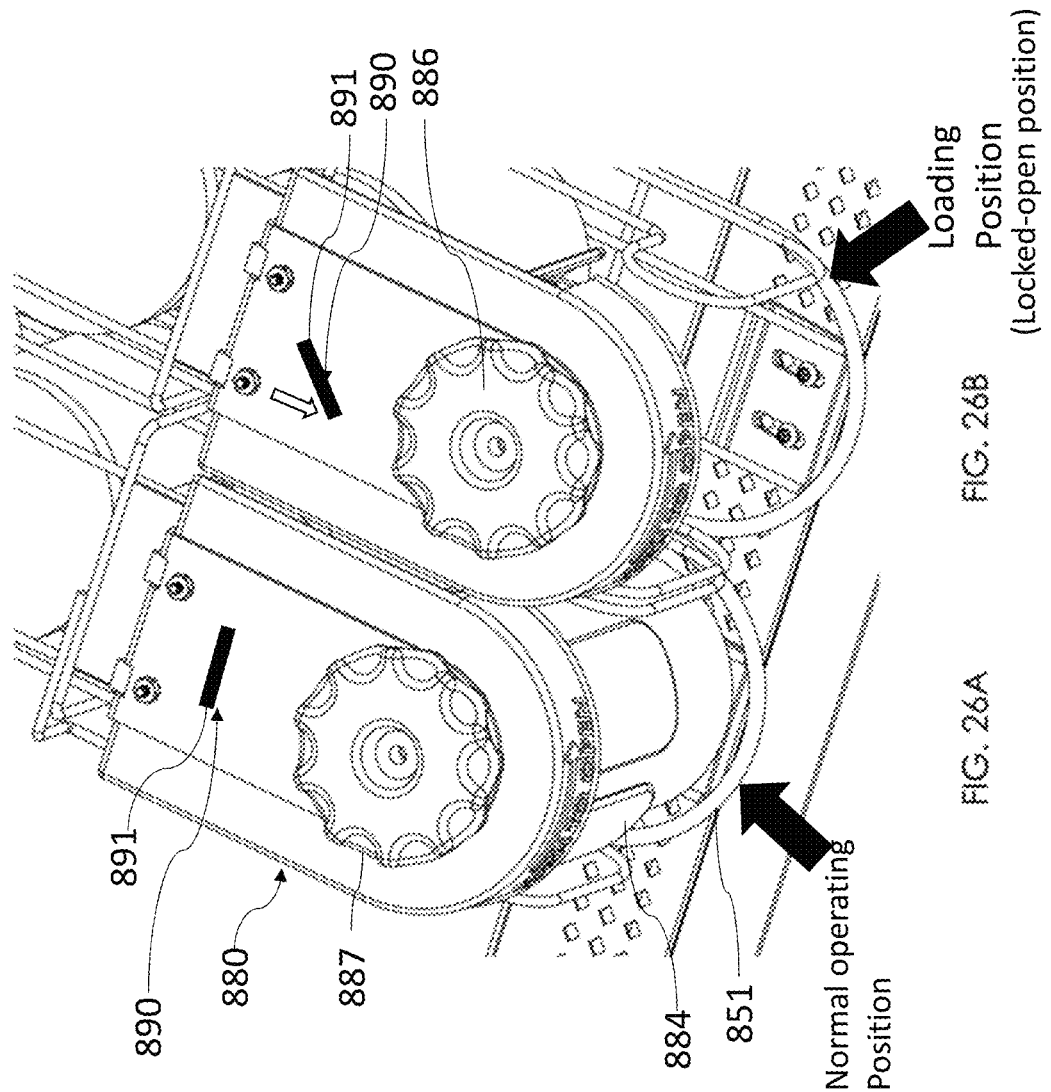
FIG. 26A illustrates a top perspective view of an embodiment of the secure product dispenser in a dispensing position.
FIG. 26B illustrates a top perspective view of an embodiment of the secure product dispenser in a loading position.
Figure 27:
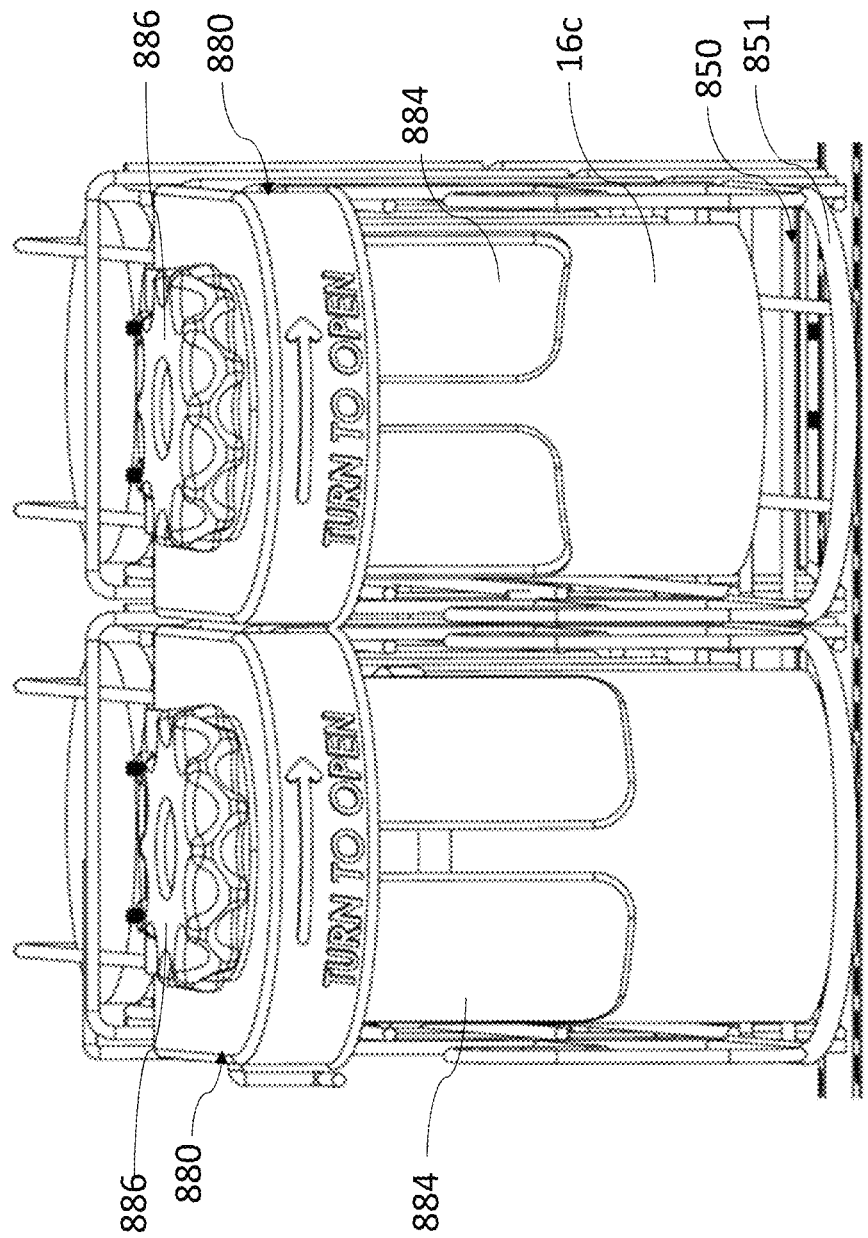
FIG. 27A illustrates a front perspective view of an embodiment of the secure product dispenser in a dispensing position.
FIG. 27B illustrates a top perspective view of an embodiment of the secure product dispenser in a loading position.

The base portion 805 may comprise, in an embodiment, a first base portion 805*a* (see FIG. 22) and a second base portion 805*b* (see FIG. 22) that are moveable relative to each other to enable the base portion to be widened or narrowed to accommodate products of varying size. The base portion 805 further includes a first (left) divider 810, a second (right) divider 820, a back portion 840, and a dispensing area 850 at least partially defined by a front stop member 851 at a front end 802 of the base portion 805. The front stop member 851 may be configured or otherwise sized to allow a label, tag, or other indicator may be affixed or coupled thereto. An extension 860 or angular adjustment member may project from or be coupled to a bottom surface 806 of the base 805 to tilt the base 805 to enable gravitational forces to assist in moving the products 10*a*, 16*a*-*c* from the back end 801 of the base 805 to a front end 802 of the base 805 as products 10*a*, 16*a*-*c* are removed from the secured product dispenser assembly 800. In another embodiment, a spring-loaded pusher is configured to advance additional units of product towards the dispensing area 850 to replace units of product being dispensed to customers.

As shown in FIGS. 18 and 22-25, the extension 860 is configured to lift a back end or rear end 801 of the base 805 relative to the front end 802 or first end of the base 805 such that the base 805 is positioned at an angle β relative to a display surface 804. The angles α (FIG. 9) and β may be the same or may be different from each other. The base 805 may further comprise one or more friction reduction elements or slide elements on a base surface 808 configured to elevate the products 10*a*, 16*a*-*c* from the base surface 808 thereby decreasing the surface friction between the base surface 808 and the products 10*a*, 16*a*-*c*. The decreased surface friction enables the products 10*a*, 16*a*-*c* to slide more freely along or relative to the base surface 808 when being dispensed.

The first and second dividers 810, 820 may have similar features as the dividers of other embodiments of the secure product dispenser assembly previously described. In an embodiment, the first and second dividers 810, 820 and the base 805 may be a single wire frame component. In another embodiment, the first and second dividers 810, 820 may be configured to adjust in height in order to accommodate products of varying heights. The height of the first and second dividers 810, 820 may be adjusted according to any of the embodiments previously discussed.

As shown specifically in FIG. 19, the top portion 870 is configured to extend between and couple to the first and second dividers 810, 820 and an interior space is delimited by the base 805, the top portion 870, the first divider 810, the second divider 820, and the back portion 840. In other embodiments, the top portion 870 may be similar to the lip 124 discussed previously discussed. Still referring to FIG. 19, the top portion 870 extends from the back end 801 towards the front end 802 of the secure product dispenser 800 to prevent products 10*a*, 16*a*-*c* from being vertically removed from the top of the secure product dispenser assembly 800. In an embodiment, the top portion 870 may be configured to be disengaged from the first and second dividers 810, 820 in order to assist in the loading of product 10*a*, 16*a-c*. In an embodiment the top portion 870 may be configured to be locked into engagement with the first and second 810, 820 dividers to prevent disengagement.

Referring to FIGS. 19 and 23-27B, the top portion 870 is coupled to a security dispenser handle assembly 880 toward the front end 802 of the secure product dispenser 800. In an embodiment, the security dispensing handle assembly 880 is injection molded from a transparent or opaque resin and is configured to be fixedly coupled to the top portion 870. As shown, the security dispensing handle assembly 880 comprises a body 882 with a top surface 881 that may embossed with surface features or lettering 883. A dispenser handle 886 is moveably coupled to the body 882 and a lip 884 may be operatively coupled to the dispenser handle 886. It may be seen in FIG. 24 that an embodiment of the dispenser handle 886 can comprise a substantially circular shape and the lip 884 may comprise a shape that is compatible with the units of products 10*a*, 16*a-c*. The lip 884 may be comprised of transparent, translucent, or opaque plastic, or a metal.

Figure 21:
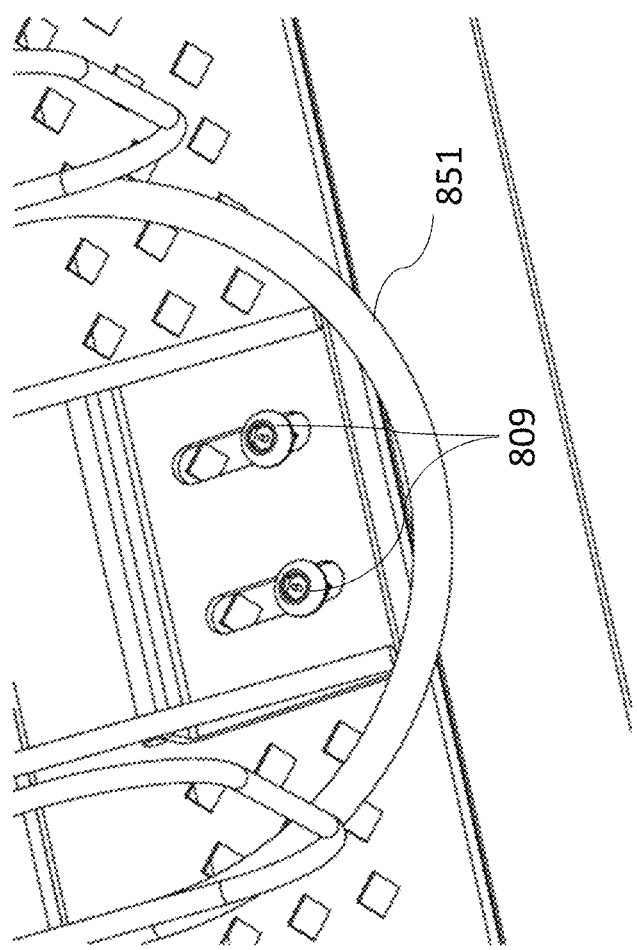
FIG. 21 illustrates a close-up view of a front end portion of the embodiment of the secure product dispenser assembly.

Turning to FIGS. 26A and 27A, the dispensing handle assembly 880 is depicted in the closed position. In the closed position, the top portion 870, the first and second dividers 810, 820, the lip 884, and the front stop 851 all act to prevent removal of the products 10*a*, 16*a-c* from the front end 802 of the secure product dispenser 800. In an embodiment, one or more additional side guards 855 (FIG. 25) may be provided around the dispensing area 850 to further retain a unit of product 10*a* within the dispensing area while providing added protection against theft. As can be seen, when the secure product dispenser assembly is in the closed position, the lip 884 is configured to contact and otherwise aid in retaining the top portion of the product 10*a*. Referring specifically to FIGS. 26A-B, the dispenser handle 886 may comprise one or more grasps 887 or other feature configured to assist a customer or user in operating the dispenser handle 886 to move the secure product dispenser assembly 800 between an open and closed position. Installation of the secure product dispenser assembly 800 may comprise coupling or otherwise securing one or more components of the secure product dispenser assembly 800 to the display surface 804 or display shelf. In an embodiment, the dispenser assembly 800 may be secured to the display surface 804 using one or more security screws 809 (FIGS. 21-22) positioned at various locations.

The security dispensing handle assembly 880 may comprise a lock assembly 890 that enables the dispensing handle to be moved between a dispensing mode and a loading mode. In order to dispense units of product 10*a*, 16*a-c* from the dispenser assembly 800, a lock member 891 of the lock assembly 890 is moved to or positioned in the "normal" or dispensing position (FIG. 26A). The customer may then grasp and rotate the dispenser handle 886 which acts to cause rotation of the lip 884 from the closed position as shown in FIG. 27A, to an open position shown in FIG. 27B where the lip 884 is positioned between the unit of product 10*a* in the dispensing area 850 and the next unit of product 16*a* set to enter the dispensing area 850. The customer may then remove the unit of product 10*a* from the dispensing area 850. The customer may rotate the dispenser handle 886 back to the closed position or in an embodiment, the dispenser handle 886 may be capable or rotating back to the closed position automatically, such as due to the presence of a spring-loaded mechanism in the dispensing handle assembly 880. The tilted nature of the base 805 enables gravitational force to aid movement of the next unit of product 16*a* into the dispensing area 850.

In previously discussed embodiments, the secure product dispenser assembly may be reloaded from the rear end and/or from the top, however this embodiment of the secure product dispenser assembly 800 may be front loaded by moving the lock member 891 of the lock assembly 890 from the dispensing position (FIG. 26A) to the loading position (FIG. 26B). When in the loading position, the lock assembly 890 enables the dispensing handle assembly 880 to be held in a loading position such that the lip 884 is rotated out of the closed position and held to a left or right side of the dispensing area 850 in order to enable units of product to be loaded into the dispensing area 850 and pushed towards the rear end 801 of the secure product dispenser assembly 800. Once loading is complete, the lock element 891 is moved back to the dispensing position, which causes the lip 884 to automatically return to the closed position. The dispensing handle assembly 880 is now ready to be operated by the customer to securely dispense units of product.

Figure 28:
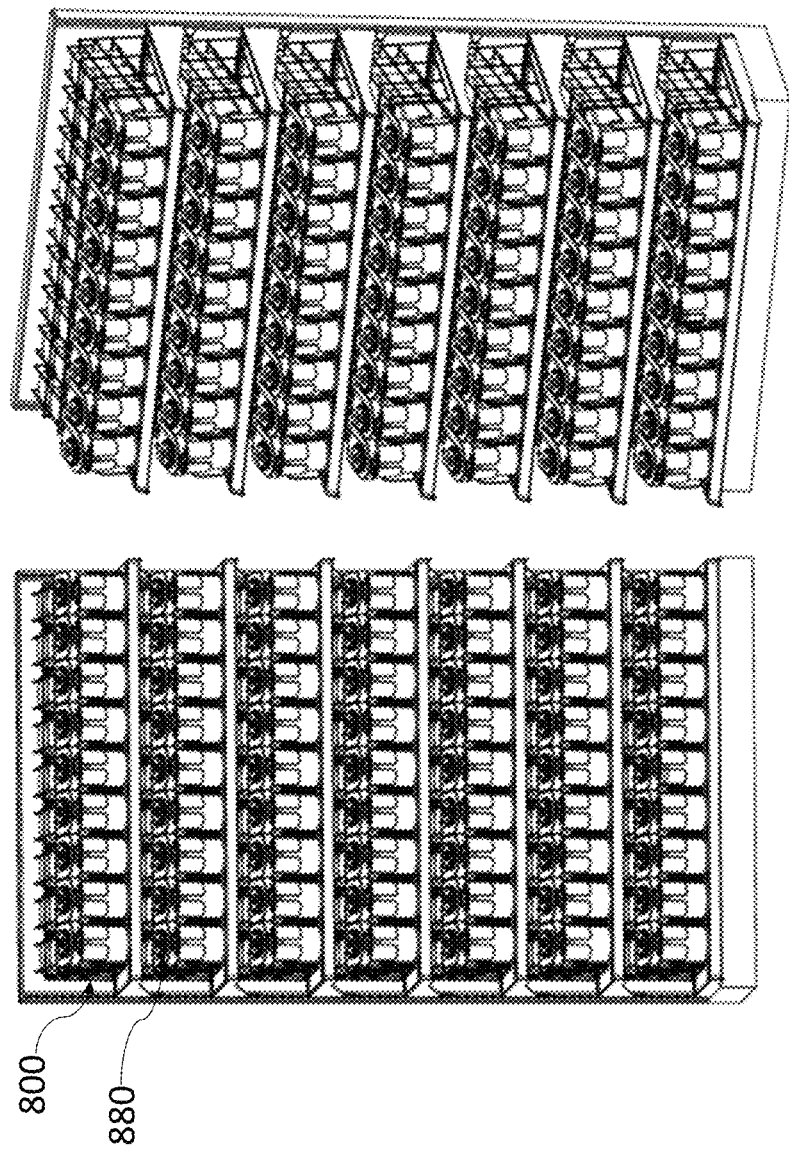
FIG. 28 illustrates a front perspective view of a plurality of secure product dispenser assemblies installed on display shelf.

As shown in FIG. 28, the secure product dispenser assembly 800 may be secured in a side-by-side configuration in a similar manner as previously discussed embodiments. However, multiple secure product dispenser assemblies 800 may be coupled together at their side surfaces by one or more coupling members 819. As shown, in FIG. 29A, the one or more coupling members 819 may be in the form of one or more hooks configured to engage a side surface of an adjacent secure product assembly 800. It is also conceivable that the secure product dispenser assembly 800 may be mounted to or otherwise hung from a wall as shown in FIG. 29B.

In another embodiment shown in FIGS. 30A-B, the one or more coupling members 819 may be positioned on a top surface 870 of the secure product dispenser assembly 800. In this embodiment, the coupling members 819 of each secure product dispenser assembly 800 may act to engage and couple adjacent secure product dispenser assemblies 800 together. The coupling members 819 may be formed as a single component with the top surface 870 or may be removeably coupled to the top surface 870 to increase the adjustability and the ability to customize. As shown, the coupling members 819 may be hooks configured to engage a portion of the wire frame of an adjacent secure product dispenser assembly 800. Each secure product dispenser assembly 800 may then be coupled to a display surface 804 using any of the methods previously discussed. In this manner, adjacent secure product dispenser assemblies 800 are secured to the display surface 804 as a single "block", thereby inhibiting vertical and horizontal movement relative to the display surface 804.

The components of the disclosed embodiments of the secure product dispensing assembly may be comprised of a rigid material resistant to fractures and moisture such as a durable plastic, a metal such as steel, or any combinations thereof.

As described above, the present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "example embodiments"

given herein are intended to be non-limiting and among others supported by representations of the present invention.

PARTS LIST 10 first product
12 neck (product)
14 base (product)
16 second product
100 secure product dispenser assembly
110 first (left) divider
112 divider top portion
113 security dispensing handle mount
114 divider lip
115 divider bottom portion
116 divider back portion
117 divider adjustable height interface
118 holes
119 ball-pin
120 second (right) divider
130 tray
132 tray back portion
140 pusher
150 facing
200 security dispensing handle
202 security dispensing handle inner ring
204 security dispensing handle outer ring
210 gripping element
220 spring mechanism
230 gear mechanism
232 teeth rack
300 locking assembly
310 first locking rail
312 first locking rail slot
314 first locking rail mount
320 second locking rail
322 second locking rail teeth
324 second locking rail hook
330 hook
340 shelf
350 lock
400 secure product dispenser assembly
410 first (left) divider
414 divider lip
420 second (right) divider
424 divider lip
500 security dispensing handle
600 secure product dispenser assembly
601 back end
602 front end
604 display surface
610 first divider
615 first divider interface
619 ball-pin
620 second divider
625 second divider interface
630 tray
631 bottom surface, tray
632 top surface, tray
634 friction reducing element, tray
636 dispensing position
640 tray back portion
650 dispensing area
651 face
660 extension
670 cap
672 security dispenser handle coupler
677 adjustable height interface
678 plurality of holes
680 security dispenser handle
682 top surface, security dispenser handle
683 surface features, security dispenser handle
684 lip, security dispenser handle
700 secure product dispenser assembly
701 unit(s) of product
705 base portion
710 first side
715 first side interface
720 second side
725 second side interface
730 bottom side
740 back side
745 back side interface
750 dispensing area
752,753,754 dispensing area sides
770 top portion
771 first retainer
772 second retainer
774 first side interface engager
775 second side interface engager
776 back side interface engager
780 dispensing handle
781 first rotating portion
782 inner ring
783 catch portion
784 outer ring
785 second rotating portion
786 inner ring opening
790 stop member
792 stop member mount
794 rearward facing surface
796 forward facing surface
800 Secure product dispenser assembly
801 Back end
802 Front end
803 Wires
804 Display surface
805 Base portion
806 Bottom surface
807 Opening
808 Base surface
809 Security screw
810 First divider
819 Coupling member
820 Second divider
840 Back portion
850 Dispensing area
851 Front top member
855 Side guard
860 Extension
870 Top portion
880 Security dispenser handle assembly
882 Body
884 Lip
886 Dispenser handle
887 Grasp
890 Lock assembly
891 Lock member

The invention claimed is:

1. A secure product dispenser assembly for holding and dispensing products, the secure product dispenser assembly comprising:
 a base including a first end and a second end and configured to accept a plurality of units of product, the base comprising,
 a first side comprising a first side interface,
 an opposing second side comprising a second side interface,
 a bottom coupled to the first and second sides; and
 a top portion configured to adjustably couple to the first side interface and the second side interface of the base;
 a dispenser portion coupled to the top portion and positioned at the first end of the base; and
 a dispensing area defined by the dispenser portion and the first end of the base,
 wherein the dispenser portion is configured to rotate between an open position to enable removal of one unit of product from the dispensing area of the base, and a closed position configured to retain and inhibit removal of the one unit of product from the dispensing area of the base,
 wherein in the open position, the dispenser portion inhibits removal of more than one unit of product, and
 wherein the dispenser portion comprises a plurality of surface features configured to interact with one or more catch elements to enable incremental rotation of the dispenser portion.

2. The secure product dispenser assembly of claim 1, further comprising an extension configured to elevate the second end of the base to enable the plurality of units of product to be gravity-fed from the second end of the base to the dispensing area.

3. The secure product dispenser assembly of claim 2, wherein the base further comprises one or more friction reducing elements configured to reduce surface friction between the plurality of units of product and the bottom of the base.

4. The secure product dispenser assembly of claim 1, wherein the dispensing portion comprises a lip extending from the dispensing portion towards the base, and wherein in the open position, the lip is configured to be positioned between the one unit of product and a remaining plurality of the units of product to inhibit removal of more than one unit of product.

5. The secure product dispenser assembly of claim 1, further comprising a pushing element configured to push the plurality of units of product from the second end of the base to the dispensing area as units of products are dispensed.

6. The secure product dispenser assembly of claim 5, wherein the pushing element comprises a spring.

7. The secure product dispenser assembly of claim 1, wherein the top portion is configured to be adjusted relative to the base to accommodate units of product of varying heights.

8. The secure product dispenser assembly of claim 1, wherein the base comprises:
 a first base portion; and
 a second base portion,
 wherein the first base portion and second base portion are configured to move relative to each other,
 wherein movement of the first base portion and the second base portion relative to each other results in the first side moving relative to the second side to accommodate units of product of varying width.

9. The secure product dispenser assembly of claim 4, further comprising a lock assembly including a lock member and defining a loading position, wherein in the loading position, the lock member is configured to hold the dispensing portion such that the lip is rotated held to a right or left side of the dispensing area to enable units of product can be loaded into the dispensing area and pushed towards the second end of the base.

10. A secure product dispenser assembly for holding and dispensing products, the secure product dispenser assembly comprising:
 a base including a first end and a second end and configured to accept a plurality of units of product, the base comprising,
 a first side comprising a first side interface,
 an opposing second side comprising a second side interface,
 a bottom coupled to the first and second sides; and
 a top portion configured to adjustably couple to the first side interface and the second side interface of the base; and
 a dispenser portion coupled to the top portion and positioned at the first end of the base;
 wherein the dispenser portion is configured to rotate between an open position to inhibit removal of more than one unit of product from the base, and a closed position configured to retain and inhibit removal of the one unit of product from the base.

11. The secure product dispenser assembly of claim 10, wherein the dispenser portion comprises a plurality of surface features configured to interact with one or more catch elements to enable incremental rotation of the dispenser portion.

12. The secure product dispenser assembly of claim 10, further comprising a lock assembly including a lock member and defining a loading position, wherein in the loading position, the lock member is configured to hold the dispensing portion in the open position such that units of product can be loaded into a dispensing area at a first end of the base and pushed towards the second end of the base.

13. The secure product dispenser assembly of claim 10, wherein at least one of the first side and the opposing second side comprises one or more coupling members configured to engage an adjacent side of another secure dispenser assembly.

14. The secure product dispenser assembly of claim 10, further comprising an extension configured to elevate the second end of the base to enable the plurality of units of product to be gravity-fed from the second end of the base to a dispensing area.

15. The secure product dispenser assembly of claim 10, wherein the base further comprises one or more friction reducing elements configured to reduce surface friction between the plurality of units of product and the bottom of the base.

16. The secure product dispenser assembly of claim 10, wherein the dispensing portion comprises a lip extending from the dispensing portion towards the base, and wherein in the open position, the lip is configured to be positioned between the one unit of product and a remaining plurality of the units of product to inhibit removal of more than one unit of product.

17. The secure product dispenser assembly of claim 14, further comprising a pushing element configured to push the plurality of units of product from the second end of the base to the dispensing area as units of products are dispensed.

18. The secure product dispenser assembly of claim 17, wherein the pushing element comprises a spring.

19. The secure product dispenser assembly of claim 10, wherein the top portion is configured to be adjusted relative to the base to accommodate units of product of varying heights.

* * * * *